US009329158B2

(12) United States Patent
Liu et al.

(10) Patent No.: US 9,329,158 B2
(45) Date of Patent: May 3, 2016

(54) EPOXY CHEMISTRY DERIVED MATERIALS AS MIXED MODE CHROMATOGRAPHY MEDIA, METHOD FOR THEIR SYNTHESIS AND USE

(71) Applicants: Xiaodong Liu, Cupertino, CA (US); Liang Cao, Fremont, CA (US); Christopher A. Pohl, Union City, CA (US)

(72) Inventors: Xiaodong Liu, Cupertino, CA (US); Liang Cao, Fremont, CA (US); Christopher A. Pohl, Union City, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 258 days.

(21) Appl. No.: 13/842,391

(22) Filed: Mar. 15, 2013

(65) Prior Publication Data

US 2014/0273264 A1  Sep. 18, 2014

(51) Int. Cl.
| | |
|---|---|
| *C07F 7/10* | (2006.01) |
| *B01J 20/281* | (2006.01) |
| *B01J 39/26* | (2006.01) |
| *B01J 41/20* | (2006.01) |
| *B01J 20/289* | (2006.01) |
| *B01J 20/32* | (2006.01) |

(52) U.S. Cl.
CPC ............. *G01N 30/482* (2013.01); *B01J 20/289* (2013.01); *B01J 20/3257* (2013.01); *B01J 20/3259* (2013.01); *B01J 20/3285* (2013.01); *B01J 39/26* (2013.01); *B01J 41/20* (2013.01); *B01J 2220/54* (2013.01)

(58) Field of Classification Search
USPC .......................................... 556/419, 429, 437
See application file for complete search history.

(56) References Cited

U.S. PATENT DOCUMENTS

| | | | |
|---|---|---|---|
| 4,382,124 A | 5/1983 | Meitzner et al. | |
| 5,039,419 A | 8/1991 | Bradshaw et al. | |
| 5,130,343 A | 7/1992 | Frechet et al. | |
| 5,260,094 A | 11/1993 | Giannelis et al. | |
| 5,334,310 A | 8/1994 | Frechet et al. | |
| 5,453,185 A | 9/1995 | Frechet et al. | |
| 5,728,457 A | 3/1998 | Frechet et al. | |
| 5,929,214 A | 7/1999 | Peters et al. | |
| 6,528,167 B2 | 3/2003 | O'Gara | |
| 6,887,384 B1 | 5/2005 | Frechet et al. | |
| 7,074,331 B2 | 7/2006 | Allington et al. | |
| 7,125,488 B2 | 10/2006 | Li | |
| 7,303,671 B2 | 12/2007 | Srinivasan et al. | |
| 7,468,130 B2 | 12/2008 | Liu et al. | |
| 7,557,232 B2 | 7/2009 | Liu | |
| 7,767,462 B2 | 8/2010 | Liu et al. | |
| 7,989,010 B2 | 8/2011 | Brothers, Jr. et al. | |
| 2005/0178730 A1 | 8/2005 | Li | |
| 2006/0054559 A1 | 3/2006 | Liu et al. | |
| 2006/0070937 A1 | 4/2006 | Rustamov et al. | |
| 2006/0180549 A1 | 8/2006 | Liu et al. | |
| 2009/0277838 A1 | 11/2009 | Liu et al. | |
| 2012/0245301 A1 | 9/2012 | Glad et al. | |

FOREIGN PATENT DOCUMENTS

| | | | |
|---|---|---|---|
| CN | 1092426 | 9/1994 | |
| CN | 1374523 | 10/2002 | |
| CN | 1381722 | 11/2002 | |
| CN | 101076261 | 11/2007 | |
| CN | 101306263 | 11/2008 | |
| EP | 0172579 B1 | 11/1992 | |
| EP | 0355376 A2 | 12/1995 | |
| EP | 2745904 A1 | 6/2014 | |
| JP | 8310809 | 11/1996 | |
| WO | WO92/17403 | * 10/1992 | ............. C01B 31/16 |
| WO | 2009009188 A2 | 1/2009 | |
| WO | 2009137275 | 11/2009 | |
| WO | 2012112553 | 8/2012 | |
| WO | 2013093872 A1 | 6/2013 | |

OTHER PUBLICATIONS

Maehr, "A Proposed Hew Convention for Graphic Presentation of Molecular Geometry and Topography," J. Chem. Ed., 62:114-120 (1985).
Ikada et al., "Reaction of Poly(vinyl Alcohol) with Potassium Persulfate and Graft Copolymerization," Journal of Polymer Science, vol. 12, 1829-1839 (1974).
Majors and Przybyciel, "Columns for Reversed-Phase LC Separations in Highly Aqueous Mobile Phases," LC-GC Europe, Dec. 2002.

* cited by examiner

*Primary Examiner* — Sudhakar Katakam
*Assistant Examiner* — Pancham Bakshi
(74) *Attorney, Agent, or Firm* — Jeffry S. Mann

(57) ABSTRACT

This invention provides mixed-mode stationary phase compositions, devices and systems comprising the stationary phases as well as methods of producing these compositions using epoxide ring-opening reactions. Also provided are methods of using the stationary phases of the invention in separations.

22 Claims, 28 Drawing Sheets

EPOXY CHEMISTRY DERIVED MATERIALS AS MIXED MODE CHROMATOGRAPHY MEDIA, METHOD FOR THEIR SYNTHESIS AND USE

FIELD OF THE INVENTION

The epoxy-ring opening reaction is a well-known and versatile approach to introduce various functionalities in organic synthesis. This synthetic methodology can be applied to solid substrates, including inorganic materials and polymer resins that contain oxirane, hydroxyl, mercapto and amino groups, to develop a broad range of novel mixed-mode stationary phases for chromatographic applications.

BACKGROUND OF THE INVENTION

Selectivity, mainly governed by column chemistry, is the key in HPLC separation. Although reversed-phase columns (e.g., $C_{18}$) are most commonly used in pharmaceutical applications, they often fail to retain highly polar molecules (e.g. counter ions), and offer limited selectivities. Ion exchange (IEX) chromatography is used to separate ionic or ionizable molecules. Ion pairing agents can be added to the mobile phase to tailor the separation capabilities for a variety of sample types, but this often results in extended equilibration time, a complicated mobile phase that is incompatible with MS, and a dedicated column.

Mixed-mode chromatography provides a viable solution to these challenges by using both reversed phase and ion-exchange retention mechanisms. One major advantage of this approach is that column selectivity can easily be modified by adjusting mobile phase ionic strength, pH and/or organic solvent concentration. As the result, not only is the selectivity of a mixed-mode column complementary to that of reversed-phase columns, but it also allows for the development of multiple complementary selectivities on a given column under different appropriate conditions. Mixed-mode chromatography is well-suited to retaining ionic analytes, hydrophobic (e.g. Naproxen) or hydrophilic (e.g. $Na^+$ and $Cl^-$ ions), and requires no ion-pairing agents in the method, significantly improving MS compatibility. This technique has been growing rapidly because of its advantages over conventional chromatography, such as its high resolution, adjustable selectivity, high sample loading, and no need for ion-pairing agents. Many applications involving hydrophilic ionizable compounds that are problematic on a C18 column are easily addressed on a mixed-mode column.

Mixed-mode media can be classified into three categories based on column chemistry. The first type includes a blend of two different stationary phases (RP and IEX). The second type involves bonded silica, modified by a mixture of both RP and IEX ligands in the bonding step. Although these two materials seem straightforward to synthesize, their use in many applications is limited by selectivity drifting, mainly due to the difference in hydrolytic stability between the RP and IEX ligand bonded sites. Newer mixed-mode media (the third type) use functional silyl ligands that contain both RP and IEX functionalities to covalently modify silica particles. The constant ratio between RP and IEX bonded sites greatly improves the ruggedness of selectivity of the resulting phases so that more reliable chromatographic methods can be developed. This invention presents a new and single approach to make the third type of mixed-mode media using the epoxide ring-opening reaction.

Compositions useful in chromatographic separations, as well as methods of making and using these compositions, have been created and are described herein. Other embodiments, advantages and objects of the invention are set forth in the Detailed Description.

SUMMARY OF THE INVENTION

Figure 1:
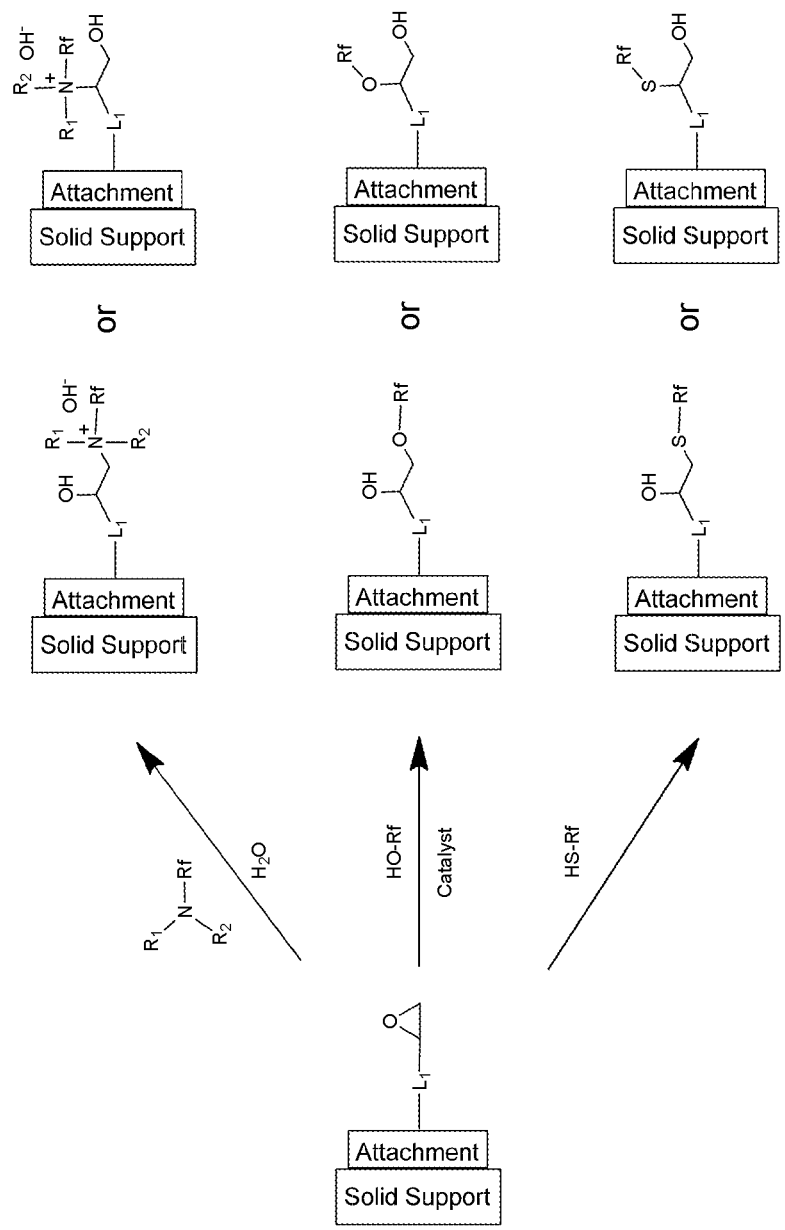
FIG. 1 illustrates the general synthetic route of epoxy ring-opening reaction for making reversed-phase/ion-exchange mixed-mode phases.

In a first aspect, the invention provides a composition comprising a compound covalently bound to a substrate, said compound having a structure according to Formula (I)

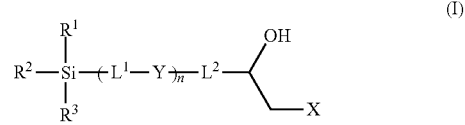

in which n is an integer selected from 0 and 1, X is selected from the group consisting of $NR^fR^{21}R^{22}$, $SR^f$, and $OR^f$. $R^f$ is selected from substituted or unsubstituted alkyl, and substituted or unsubstituted heteroalkyl. $R^f$ includes at least one ion exchange moiety (e.g., carboxylic acid, sulfonic acid, phosphoric acid, or a zwitterion, e.g., an amino acid). In an embodiment, $R^f$ includes at least one ion exchange moiety when X is $SR^f$ or $OR^f$. $R^{21}$ is selected from H, substituted or unsubstituted alkyl, and substituted or unsubstituted heteroalkyl. $R^{22}$ is selected from a lone pair of electrons, H, substituted or unsubstituted alkyl, and substituted or unsubstituted heteroalkyl. The moieties $R^1$, $R^2$ and $R^3$ are selected independently from halogen, $OR^{10}$, $NR^{10}R^{11}$, $OC(O)R^{12}$, $OS(O)_2R^{12}$, substituted or unsubstituted alkyl, substituted or unsubstituted heteroalkyl, substituted or unsubstituted aryl, substituted or unsubstituted heteroaryl, substituted or unsubstituted heterocycloalkyl and a bond to the substrate. In an exemplary embodiment, at least one of $R^1$, $R^2$ and $R^3$ is bound to the substrate or is a bond to the substrate. Each $R^{10}$ and each $R^{11}$ is selected independently from the group consisting of H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to a silica gel substrate. In various embodiments, at least one of $R^1$, $R^2$ and $R^3$ is unsubstituted $C_1$-$C_3$ alkyl or OH. Each $R^{12}$ is selected independently from substituted or unsubstituted alkyl, substituted or unsubstituted heteroalkyl, substituted or unsubstituted aryl, substituted or unsubstituted heteroaryl, and substituted or unsubstituted heterocycloalkyl. $L^1$ and $L^2$ are linker groups independently selected from substituted or unsubstituted alkyl, substituted or unsubstituted heteroalkyl, substituted or unsubstituted aryl, substituted or unsubstituted heteroaryl and substituted or unsubstituted heterocycloalkyl. Y is O.

In another aspect, the instant invention produces novel reversed-phase/ion-exchange mixed-mode materials in the following manner:
1. Covalently attach a silane ligand containing the oxirane group to the silica surface.
2. Perform ring opening reaction (e.g., under base or acid catalysis condition) using a reagent containing (primary, secondary, or tertiary) amino group, containing both amino and carboxylic groups, containing both amino and sulfonate groups, containing both amino and phosphoric groups, containing both hydroxyl and carboxylic group, containing both hydroxyl and sulfonate groups, containing both hydroxyl and phosphoric groups, containing both thiol and carboxylic group, containing both thiol and sulfonate groups, or containing both thiol and phosphoric groups.
3. Hydrolyze all residual oxirane groups to obtain the final product.

The benefits of the invention(s) described herein include unique selectivity; flexible chemistry and easy of synthesis. Depending on the specific separation requirement, various mixed-mode media can be developed using the approach described herein, such as reversed-phase/anion-exchange mixed-mode media, reversed-phase/cation-exchange mixed-mode media, and reversed-phase/zwitterionic mixed-mode media.

DETAILED DESCRIPTION OF THE INVENTION

I. Definitions

Where substituent groups are specified by their conventional chemical formulae, written from left to right, they optionally equally encompass the chemically identical substituents, which would result from writing the structure from right to left, e.g., —$CH_2O$— is intended to also recite —$OCH_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl (e.g., —$CH_2$—$CH_2$—$CH_3$, —$CH_2$—$CH_2$—$CH_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups that are limited to hydrocarbon groups are termed "homoalkyl". The term "alkyl" can also mean "alkylene" or "alkyldiyl" as well as alkylidene in those cases where the alkyl group is a divalent radical.

The term "alkylene" or "alkyldiyl" by itself or as part of another substituent means a divalent radical derived from an alkyl group, as exemplified, but not limited, by —$CH_2CH_2CH_2$— (propylene or propane-1,3-diyl), and further includes those groups described below as "heteroalkylene." Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

The term "alkylidene" by itself or as part of another substituent means a divalent radical derived from an alkyl group, as exemplified, but not limited, by $CH_3CH_2CH_2$=(propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$—S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Exemplary substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —OS(O)$_2$R', —S(O)$_2$NR'R", —NRSO$_2$R', —CN and —NO$_2$ in a number ranging from zero to (2 m'+1), where m' is the total number of carbon atoms in such radical. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R'" and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R'" and R"" groups when more than one of these groups is present.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R'")$_d$—, where s and d are independently integers of from 0 to 3, and X is —O—, —NR'—, —S—, —S(O)—, —S(O)$_2$—, or —S(O)$_2$NR'—. The substituents R, R', R" and R'" are preferably independently selected from hydrogen or substituted or unsubstituted (C$_1$-C$_6$)alkyl.

As used herein, the term "silyl group substituent" can be one or more of a variety of groups selected from, but not limited to: substituted or unsubstituted alkyl, substituted or unsubstituted heteroalkyl, substituted or unsubstituted aryl, substituted or unsubstituted heteroaryl, substituted or unsubstituted heterocycloalkyl, acyl, —OR', —NR'R", —SR', -halogen, —SiR'R"R'", —OC(O)R', —C(O)R', —CO$_2$R', —CONR'R", —OC(O)NR'R", —NR"C(O)R', —NR'—C(O)NR"R'", —NR"C(O)$_2$R', —NR—C(NR'R"R'")=NR"", —NR—C(NR'R")=NR'", —S(O)R', —S(O)$_2$R', —OS(O)$_2$R', —S(O)$_2$NR'R", —NRSO$_2$R', —CN and —NO$_2$. R', R", R'" and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R'" and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

As used herein, the term "non-reactive silyl group substituent" means a "silyl group substituent" that does not react with a substrate of the invention to form a covalent bond between the silyl group substituent and the substrate or, does not behave as a leaving group in a reaction between the ligand (e.g., Formula I) and the substrate. Exemplary "non-reactive silyl group substituents" include alkyl (e.g., methyl, ethyl, propyl, butyl and other lower alkyl groups) or aryl groups (e.g., phenyl and thiophenyl).

As used herein, the term "reactive silyl group substituent" means a "silyl group substituent" that is capable of reacting with a substrate of the invention to form a covalent bond between the silyl group substituent and the substrate, or which acts as a leaving group in a reaction between the ligand (e.g., 1) and the substrate. Exemplary "reactive silyl group substituents" include those groups that are conventionally defined as leaving groups, such as halogens (e.g., Cl and Br).

Other exemplary "reactive silyl group substituents" include alkoxy groups (e.g., methoxy or ethoxy) and primary and secondary amino groups.

As used herein, the term "acyl" describes a substituent containing a carbonyl residue, C(O)R. Exemplary species for R include H, halogen, substituted or unsubstituted alkyl, substituted or unsubstituted heteroalkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non aromatic rings. Examples of "fused ring systems" are naphthalenes, indoles, quinolines, chromenes and the like.

As used herein, the term "heteroatom" includes oxygen (O), nitrogen (N), sulfur (S), and silicon (Si).

The symbol "R" is a general abbreviation that represents a substituent group that is selected from substituted or unsubstituted alkyl, substituted or unsubstituted heteroalkyl, substituted or unsubstituted aryl, substituted or unsubstituted heteroaryl, and substituted or unsubstituted heterocycloalkyl groups.

When compounds of the present invention contain relatively basic or acidic functionalities, salts of such compounds are included in the scope of the invention. Salts can be obtained by contacting the neutral form of such compounds with a sufficient amount of the desired acid or base, either neat or in a suitable inert solvent. Examples of salts for relative acidic compounds of the invention include sodium, potassium, calcium, ammonium, organic amino, or magnesium salts, or a similar salts. When compounds of the present invention contain relatively basic functionalities, acid addition salts can be obtained by contacting the neutral form of such compounds with a sufficient amount of the desired acid, either neat or in a suitable inert solvent. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like (see, for example, Berge et al., *Journal of Pharmaceutical Science* 1977, 66: 1-19). Certain specific compounds of the present invention contain both basic and acidic functionalities that allow the compounds to be converted into either base or acid addition salts.

When a residue is defined as "O$^-$" (e.g. COO$^-$), then the formula is meant to optionally include H or a cationic counterion. Preferably, the salt form of the compound is pharmaceutically acceptable.

The neutral forms of the compounds are preferably regenerated by contacting the salt with a base or acid and isolating the parent compound in the conventional manner. The parent form of the compound differs from the various salt forms in certain physical properties, such as solubility in polar solvents, but otherwise the salts are equivalent to the parent form of the compound for the purposes of the present invention.

Certain compounds of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention. "Compound or a pharmaceutically acceptable salt or solvate of a compound" intends the inclusive meaning of "or", in that a material that is both a salt and a solvate is encompassed.

Certain compounds of the present invention possess asymmetric carbon atoms (optical centers) or double bonds; the racemates, diastereomers, geometric isomers and individual isomers are encompassed within the scope of the present invention. Optically active (R)- and (S)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

The graphic representations of racemic, ambiscalemic and scalemic or enantiomerically pure compounds used herein are taken from Maehr, *J. Chem. Ed.*, 62: 114-120 (1985): solid and broken wedges are used to denote the absolute configuration of a chiral element; wavy lines indicate disavowal of any stereochemical implication which the bond it represents could generate; solid and broken bold lines are geometric descriptors indicating the relative configuration shown but not implying any absolute stereochemistry; and wedge outlines and dotted or broken lines denote enantiomerically pure compounds of indeterminate absolute configuration.

The compounds of the present invention may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The terms "average diameter of the particle", "particle size", "average particle size", "median particle size", or any grammatical variation thereof refers to the particle size specification for a substrate (solid-support) of the invention. Particle-sizes are typically provided by the manufacturer. Particle sizes can refer to any type of particle including spherical and irregular-shaped particles.

"Mobile phase" and "eluent" are used interchangeably referring to a liquid that moves dissolved components (e.g., a glycan) of a mixture that is to be separated through a chromatographic column or other separation device. The mobile phase often contains more than one compound and is a mixture of different solvents or a solution of salts, acids, bases, etc.

"Solvent" is a liquid organic compound (e.g., a single compound). An exemplary solvent is at least partially water miscible. In various embodiments, a solvent is fully water miscible. In various embodiments, "solvent" refers to acetonitrile.

II. Compositions

IIa. Stationary Phases

The current invention provides compositions, which are useful as stationary phases or packing materials for a variety of chromatographic applications. Alternatively, the compositions of the invention may be used in other products useful for separation, detection and analysis of compounds, such as membranes, filters and microfluidic devices.

Figure 2:
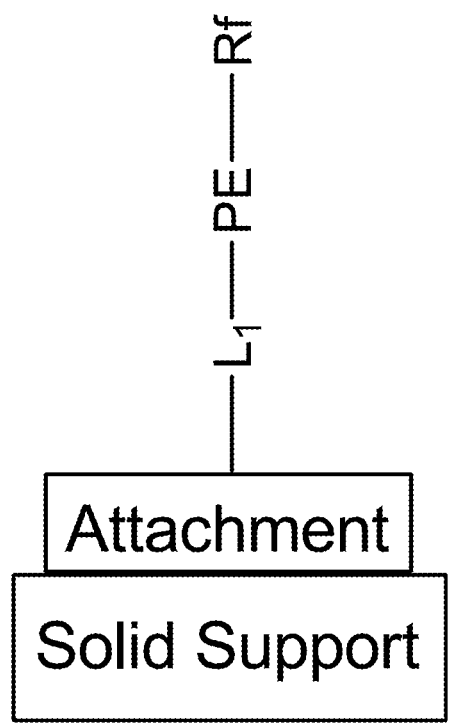
FIG. 2 illustrates the general compositions of new stationary phases.
Figure 3:
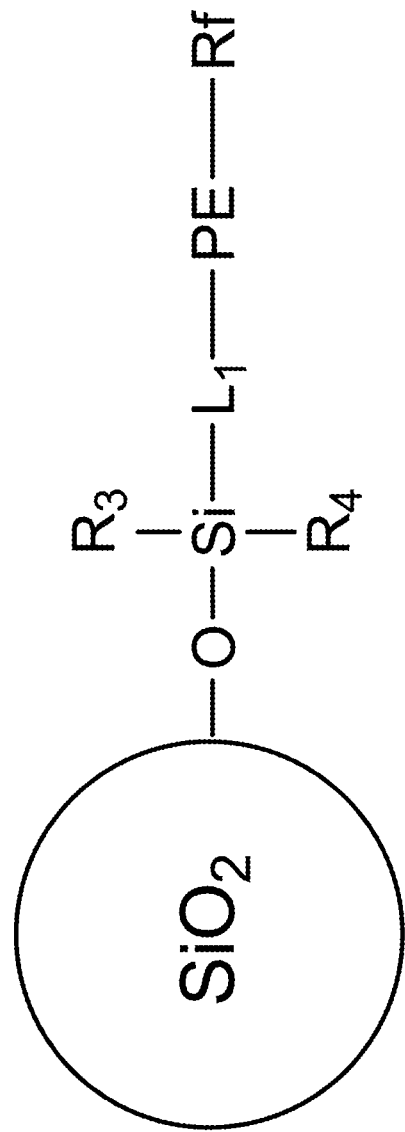
FIG. 3 illustrates the general composition of silica based new stationary phases.

The compositions include a substrate (e.g., silica gel) and a compound, which is covalently bound to the substrate via a silyl group. The compound includes at least one hydrophobic linker as well as a polar head group. The compositions of the invention can generally be described by the following structure, wherein n is either 0 or 1:

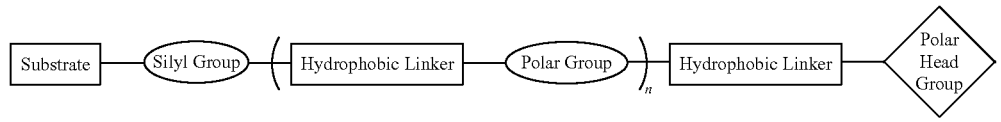

in which the "Head Group" is a polar moiety, e.g., an ion exchange moiety. Further exemplary polar head groups include one or more hydroxyl or alkoxyl moieties. The Silyl Group serves to bind the substrate to the chromatographic functionality. In various embodiments, the index n is 0 or 1. When the index n is 1, the chromatographic functionality includes an embedded polar group. In an exemplary embodiment, the embedded polar group is S or O. See, e.g., FIG. 1-FIG. 3.

In an exemplary embodiment, the invention provides a composition comprising a compound covalently bound to a substrate, said compound having a structure according to Formula (I)

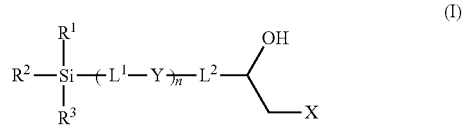

in which n is an integer selected from 0 and 1, X is selected from the group consisting of $NR'R^{21}R^{22}$, $SR^f$, and $OR^f$, wherein $R^f$ is selected from the group consisting of substituted or unsubstituted alkyl, and substituted or unsubstituted heteroalkyl; $R^{21}$ is selected from the group consisting of H, substituted or unsubstituted alkyl, and substituted or unsubstituted heteroalkyl; $R^{22}$ is selected from the group consisting of a lone pair of electrons, H, substituted or unsubstituted alkyl, and substituted or unsubstituted heteroalkyl; $R^1$, $R^2$ and $R^3$ are selected independently from the group consisting of halogen, $OR^{10}$, $NR^{10}R^{11}$, $OC(O)R^{12}$, $OS(O)_2R^{12}$, substituted or unsubstituted alkyl, substituted or unsubstituted heteroalkyl, substituted or unsubstituted aryl, substituted or unsubstituted heteroaryl, substituted or unsubstituted heterocycloalkyl and a bond to said substrate. Each $R^{10}$ and each $R^{11}$ is selected independently from the group consisting of H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to a silica substrate, with the proviso that at least one of $R^1$, $R^2$ and $R^3$ is unsubstituted $C_1$-$C_3$ alkyl or OH. Each $R^{12}$ is selected independently from the group consisting of substituted or unsubstituted alkyl, substituted or unsubstituted heteroalkyl, substituted or unsubstituted aryl, substituted or unsubstituted heteroaryl, and substituted or unsubstituted heterocycloalkyl; In various embodiments, at least one of $R^1$, $R^2$ and $R^3$ is covalently bound to, or is a bond to, the substrate. $L^1$ and $L^2$ are linker groups independently selected from substituted or unsubstituted alkyl, substituted or unsubstituted heteroalkyl, substituted or unsubstituted aryl, substituted or unsubstituted heteroaryl and substituted or unsubstituted heterocycloalkyl. Y is O.

In various embodiments, $R^1$, $R^2$ and $R^3$ are selected independently from $OR^{10}$, $OC(O)R^{12}$, $OS(O)_2R^{12}$, and unsubstituted alkyl. In an exemplary embodiment, each $R^{10}$ and each $R^{11}$ is selected independently from H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to a silica gel substrate with the proviso that at least one of $R^1$, $R^2$ and $R^3$ is unsubstituted $C_1$-$C_3$ alkyl or OH, and each $R^{12}$ is selected independently from the group consisting of substituted or unsubstituted alkyl, substituted or unsubstituted heteroalkyl, substituted or unsubstituted aryl, substituted or unsubstituted heteroaryl, and substituted or unsubstituted heterocycloalkyl. The symbol $L^1$ represents $C_3$ unsubstituted alkyl; and the symbol $L^2$ represents $C_1$-$C_8$ unsubstituted alkyl.

In various embodiments, the stationary phase of the invention has the formula:

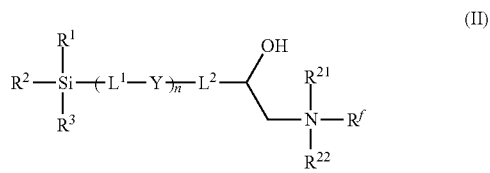

(II)

The ligand can be bound to the support by one, two, three or more bonds. In an exemplary embodiment, when the structure of the stationary phase is according to Formula (II), at least one of $R^1$, $R^2$ and $R^3$ are covalent bonds to the substrate or are covalently bound to the substrate. In various embodiments, $R^1$ and $R^2$ are bonds to the substrate or are covalently bound to the substrate, and $R^3$ is unsubstituted $C_1$-$C_3$ alkyl or OH. In exemplary embodiments, $R^1$ and $R^2$ are covalent bonds to the substrate or they are covalently bound to the substrate, and $R^3$ is methyl or OH.

In various embodiments, $R^{21}$ is unsubstituted alkyl (e.g., $C_1$ or $C_2$ or $C_3$ alkyl) and $R^{22}$ is unsubstituted alkyl (e.g., $C_1$ or $C_2$ or $C_3$ alkyl). Either $R^{21}$ or $R^{22}$ can be a lone pair of electrons. In an exemplary embodiment, $R^{22}$ is a lone pair of electrons. In another exemplary embodiment, $R^{21}$ is H and $R^{22}$ is a lone pair of electrons.

In various embodiments $R^f$ is alkyl substituted with a carboxylic acid.

In an exemplary embodiment, wherein n is 0, $L^2$ is $C_1$-$C_8$ (e.g., $C_5$-$C_8$, e.g., $C_8$) unsubstituted alkyl. In various embodiments, wherein n is 1, $L^1$ is $C_2$-$C_5$ (e.g., $C_3$) unsubstituted alkyl, and $L^2$ is $C_1$-$C_3$ (e.g., $C_1$) unsubstituted alkyl.

Silyl Group Substituents

In Formula (I), $R^1$, $R^2$ and $R^3$ are silyl group substituents. At least one of $R^1$, $R^2$ and $R^3$ is covalently bound to a substrate of the invention. In an exemplary embodiment, one of $R^1$, $R^2$ and $R^3$ is covalently bound to the substrate. In another exemplary embodiment, two of $R^1$, $R^2$ and $R^3$ are covalently bound to the substrate. In yet another exemplary embodiment, each of $R^1$, $R^2$ and $R^3$ is covalently bound to the substrate.

In one example, $R^1$, $R^2$ and $R^3$ are members independently selected from halogen, $OR^{10}$, $NR^{10}R^{11}$, acyl, $OC(O)R^{12}$, $OS(O)_2R^{12}$, substituted or unsubstituted alkyl, substituted or unsubstituted heteroalkyl, substituted or unsubstituted aryl, substituted or unsubstituted heteroaryl and substituted or unsubstituted heterocycloalkyl, wherein each $R^{10}$ and each $R^{11}$ is a member independently selected from H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to a substrate of the invention (e.g., silica gel). Each $R^{12}$ is a member independently selected from substituted or unsubstituted alkyl, substituted or unsubstituted heteroalkyl, substituted or unsubstituted aryl, substituted or unsubstituted heteroaryl, substituted or unsubstituted heterocycloalkyl. In an exemplary embodiment, a reactive silyl group substituent is converted to a non-reactive silyl group substituent by "capping". In various embodiments, the silyl group substituent is capped with a reactive silyl reagent, e.g., hexamethyldisilazane.

In another example, at least one of $R^1$, $R^2$ and $R^3$ is a non-reactive silyl group substituent. Exemplary non-reactive silyl group substituents include alkyl groups or aryl groups. In an exemplary embodiment, at least one of $R^1$, $R^2$ and $R^3$ is a member selected from substituted or unsubstituted $C_1$-$C_6$ alkyl (e.g., methyl, ethyl, n-propyl, iso-propyl, n-butyl, iso-butyl and the like). In yet another example, two of $R^1$, $R^2$ and $R^3$ are non-reactive silyl group substituents. For example, two of $R^1$, $R^2$ and $R^3$ are members independently selected from substituted or unsubstituted alkyl, such as substituted or unsubstituted $C_1$-$C_6$ alkyl (e.g., methyl, ethyl, n-propyl, iso-propyl, n-butyl, iso-butyl and the like). In an exemplary embodiment, one of $R^1$, $R^2$ and $R^3$ is unsubstituted $C_1$-$C_3$ alkyl or OH. In an exemplary embodiment, one of $R^1$, $R^2$ and $R^3$ is unsubstituted $C_1$-$C_3$ alkyl. In an exemplary embodiment, one of $R^1$, $R^2$ and $R^3$ is methyl. In an exemplary embodiment, one of $R^1$, $R^2$ and $R^3$ is OH. In an exemplary embodiment, two of $R^1$, $R^2$ and $R^3$ are unsubstituted $C_1$-$C_3$ alkyl or OH. In an exemplary embodiment, two of $R^1$, $R^2$ and $R^3$ are unsubstituted $C_1$-$C_3$ alkyl. In an exemplary embodiment, two of $R^1$, $R^2$ and $R^3$ are methyl. In an exemplary embodiment, two of $R^1$, $R^2$ and $R^3$ are OH.

Linker

In Formula (I), $L^1$ and $L^2$ in Formula (I) are linker groups, which in one embodiment, are independently selected from substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl.

In an exemplary embodiment, the compounds of the invention include at least one hydrophobic linker. When n is 1, at least one of $L^1$ and $L^2$ in Formula (I) includes a hydrophobic moiety. When n is 0, $L^2$ optionally includes a hydrophobic moiety. In this context, a "hydrophobic moiety" includes a carbon chain having an exemplary number of carbon atoms in sequence, wherein this number is defined by a lower and an upper limit. With respect to the lower limit the hydrophobic moiety has preferably at least 2, at least 3, at least 4, at least 5, at least 6, at least 7, at least 8, at least 9, at least 10, at least 11, or at least 12 carbon atoms in sequence. In an exemplary embodiment, the hydrophobic moiety has at least 7 carbon atoms in sequence. With respect to the higher limit, the hydrophobic moiety includes preferably not more than about 50 carbon atoms in sequence, not more than about 30 carbon atoms, not more than about 25 carbon atoms, not more than about 20 carbon atoms, or not more than about 15 carbon atoms in sequence. Exemplary ranges for the number of carbon atoms in sequence may be formed between the above described higher and lower limits. In yet another embodiment, the hydrophobic moiety includes more than 50 carbon atoms in sequence. In an exemplary embodiment, $L^2$ is derived from the reaction of glycidyl ether bonded silica.

In various embodiments, at least one of $L^1$ and $L^2$ is a carbon chain comprising at least 3 carbon atoms in sequence. In various embodiments, $L^1$ and $L^2$ combined include at least 4, 5, 6, 7, 8, 9, 10, 11, 12, 13, 14, 15, 16, 17, 18, 19 or at least 20 carbon atoms in sequence. In an exemplary embodiment, $L^1$ is a $C_3$ chain. In various embodiments, $L^2$ is $C_1$. In an exemplary embodiment, $L^1$ is a $C_3$ chain and $L^2$ is $C_1$.

Within the hydrophobic moiety, at least two of the carbon atoms in sequence are optionally part of a ring (e.g., a 5- or 6-membered ring), wherein the ring is a member selected from aryl, heteroaryl, cycloalkyl and a fused ring system that can include aryl, heteroaryl and cycloalkyl rings. The ring is optionally substituted with a non-polar (hydrophobic) substituent, such as an unsubstituted alkyl group (e.g., methyl, ethyl or propyl group). In an exemplary embodiment, the hydrophobic moiety is sufficiently hydrophobic for the compositions to exhibit reversed phase characteristics.

In an exemplary embodiment, $L^1$ is unsubstituted $C_1$-$C_7$ alkyl. In an exemplary embodiment, $L^1$ is unsubstituted $C_1$-$C_3$ alkyl. In an exemplary embodiment, $L^1$ is unsubstituted $C_4$-$C_7$ alkyl. In an exemplary embodiment, $L^1$ is $C_3$ unsubstituted alkyl.

In an exemplary embodiment, $L^2$ is unsubstituted $C_1$-$C_7$ alkyl. In an exemplary embodiment, $L^2$ is unsubstituted $C_1$-$C_3$ alkyl. In an exemplary embodiment, $L^2$ is unsubstituted $C_4$-$C_7$ alkyl. In an exemplary embodiment, $L^2$ is $C_1$ unsubstituted alkyl.

When in Formula (I) n is 1, then the compound of the invention includes an embedded polar group Y. This group can be any suitable group useful to connect the two linker groups $L^1$ and $L^2$. In one embodiment, $L^1$ and $L^2$ are connected through an ether bond or a thioether bond. In an exemplary embodiment, Y is O, or S.

Polar Group Y

When in Formula (I) n is 1, then the compound of the invention includes a polar group Y. This group can be any suitable group useful to connect the two linker groups $L^1$ and $L^2$. In one embodiment, $L^1$ and $L^2$ are connected through an ether bond or a thioether bond. In an exemplary embodiment, Y is O.

Polar Head Group

The polar head group can be any moiety that includes one, two or more hydroxyl groups. In one embodiment, the polar head group is:

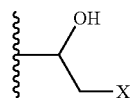

in which X is selected from the group consisting of $NR^fR^{21}R^{22}$, $SR^f$, and $OR^f$; $R^f$ is selected from the group consisting of substituted or unsubstituted alkyl and substituted or unsubstituted heteroalkyl. In various embodiments, $R^f$ includes at least one ion exchange moiety (e.g., carboxylic acid, sulfonic acid, phosphoric acid, or a zwitterion, e.g., an amino acid). In an embodiment, $R^f$ includes at least one ion exchange moiety when X is $SR^f$ or $OR^f$. $R^{21}$ is selected from H, substituted or unsubstituted alkyl, and substituted or unsubstituted heteroalkyl; $R^{22}$ is selected from a lone pair of electrons, H, substituted or unsubstituted alkyl, and substituted or unsubstituted heteroalkyl.

In an exemplary embodiment, the polar head group is:

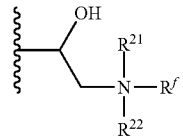

wherein $R^f$ is as described herein, and $R^{21}$ is unsubstituted alkyl and $R^{22}$ is unsubstituted alkyl. In an exemplary embodiment, $R^f$ is as described herein, $R^{21}$ is unsubstituted $C_1$ or $C_2$ or $C_3$ alkyl, and $R^{22}$ is unsubstituted $C_1$ or $C_2$ or $C_3$ alkyl. In an exemplary embodiment, $R^f$ and $R^{21}$ are as described herein, and $R^{22}$ is a lone pair of electrons. In an exemplary embodiment, $R^f$ is as described herein, $R^{21}$ is H, and $R^{22}$ is a lone pair of electrons. In an exemplary embodiment, $R^{21}$ and $R^{22}$ are as described herein, and $R^f$ is alkyl substituted with an amino moiety. In an exemplary embodiment, $R^{21}$ and $R^{22}$ are as described herein, and $R^f$ is alkyl substituted with a carboxylic acid moiety. In an exemplary embodiment, $R^{21}$ and $R^{22}$ are as described herein, and $R^f$ is alkyl substituted with a sulfonate moiety. In an exemplary embodiment, $R^{21}$ and $R^{22}$ are as described herein, and $R^f$ is heteroalkyl substituted with an amino moiety. In an exemplary embodiment, $R^{21}$ and $R^{22}$ are as described herein, and $R^f$ is heteroalkyl substituted with a carboxylic acid moiety. In an exemplary embodiment, $R^{21}$ and $R^{22}$ are as described herein, and $R^f$ is heteroalkyl substituted with a sulfonate moiety.

In an exemplary embodiment, the polar head group is:

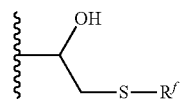

and $R^f$ is as described herein. In an exemplary embodiment, $R^f$ is alkyl substituted with a carboxylic acid.

Substrate

The substrate of the invention can be any material (e.g., particles) useful as a stationary phase/packing material for chromatography including porous and non-porous solids.

The substrate or solid support of the chromatographic medium of the invention can be any material (e.g., particles) useful as a chromatographic medium/packing material for chromatography including porous and non-porous solids.

In various embodiments, the solid support is selected from particulates or monoliths. Exemplary particles include silica particles, silica/organo hybrid particles, core-shell particles, $TiO_2$ particles, $ZrO_2$ particles, and $Al_2O_3$ particles.

Exemplary substrates include cross-linked and non-crosslinked polymers. Other substrates include silica-based (e.g., silicon oxide), titanium-based (e.g., titanium oxide), germanium-based (e.g., germanium oxide), zirconium-based (e.g., zirconium oxide) and aluminum-based (e.g., aluminum oxide), carbonized materials and metals.

The solid support may be formed from any synthetic resin material. Exemplary synthetic polymer ion-exchange resins include poly(phenol-formaldehyde), poly(acrylic acid), poly (methacrylic acid), polynitriles, amine-epichlorohydrin copolymers, graft polymers of styrene on polyethylene or polypropylene, poly (2-chloromethyl-1,3-butadiene), poly (vinylaromatic) resins such as those derived from styrene, α-methylstyrene, chlorostyrene, chloromethylstyrene, vinyltoluene, vinylnaphthalene or vinylpyridine, corresponding esters of acrylic acid and methacrylic acid, and similar unsaturated monomers, mono-vinylidene monomers including the monovinylidine ring-containing nitrogen heterocyclic compounds, and any copolymers of the above resins. Additional examples include glycidyl acrylate-based and glycidyl methacrylate-based materials (e.g., 2-glycidyloxyethyl methacrylate, vinylbenzyl glycidyl ether, 2-(4-vinylbenzyloxy)ethyl glycidyl ether) as well as those derived from vinylbenzyl chlorides, vinylbenzyl alcohols, 2-(4-vinylbenzyloxy)ethanol, polyacrylamides, polyvinylalcohols, polyvinylformamides.

Any of the above materials can optionally be co-polymerized with monomers incorporating ionic or ionizable, reverse-phase and/or HILIC functionalities.

In one embodiment, the support comprises cross-linked polymers or copolymers. An exemplary copolymer is styrene-divinylbenzene copolymer (e.g., PS-DVB). In one example, the styrene-divinylbenzene copolymer contains between about 2% to about 100% divinylbenzene monomer by weight. In another example, the styrene-divinylbenzene copolymer contains between about 25% to about 80% divinylbenzene monomer by weight. The copolymer can be prepared, for example, according to the method of Ikada et al., *Journal of Polymer Science*, Vol. 12, 1829-1839 (1974) or as described in U.S. Pat. No. 4,382,124 to Meitzner, et al.

In one example, the solid support includes a silica, alumina, zirconia, or titania-polymeric resin hybrid material. Exemplary silica-organic hybrids are described in U.S. Pat. No. 6,528,167 and U.S. Patent Application Publication 2006/0070937 (application Ser. No. 11/240,695), the disclosures of which are incorporated herein by reference for all purposes.

In one embodiment, a solid support of use in the present invention is formed by well known suspension polymerization techniques. In this example, the particles are typically derived from a monomer mixture, which is insoluble in the solvents with which they will be contacted. Exemplary substrates are formed by heating and stirring a suspension of monomers in a suitable solvent in the presence of a suitable emulsifying agent. Alternatively, the polymerization may be carried out by a suspension, bulk or solution process followed by grinding the resin to a desired size by mechanical means (e.g., ball mills, rod mills or the like).

The solid support can be of any form, including particulates (e.g., spherical, essentially spherical; e.g., resin beads), chips, chunks, blocks, monoliths and the like. When the substrate is in particulate form, the particles (e.g., irregular-shaped or bead-shaped, e.g., essentially spherical) have a median particle size (i.e., diameter). In one example, the median particle size of the substrate (e.g., spherical silica gel) is between about 0.1 (e.g., silica micro-spheres) and about 10,000 μm (microns). In one example, the median particle size of the substrate is between about 1 and about 5000 microns, between about 1 and about 1000 microns, between about 1 and about 500 microns, between about 1 and about 400 microns, between about 1 and about 300 microns, between about 1 and about 200 microns or between about 1 and about 100 microns. In yet another example, the median particle size of the substrate is between about 1 and about 80 microns, between about 1 and about 70 microns, between about 1 and about 60 microns, between about 1 and about 50 microns, between about 1 and about 40 microns, between about 1 and about 30 microns, between about 1 and about 20 microns or between about 1 and about 10 microns. In other example, the median particle size of the substrate particles is between about 10 and about 100 microns, between about 10 and about 80 microns, between about 40 and about 200 microns, between about 40 and about 100 microns, between about 40 and about 80 microns, between about 60 and about 200 microns, between about 60 and about 100 microns, between about 70 and about 200 microns, between about 80 and about 200 microns, between about 100 and about 200 microns, between about 200 and about 600 microns, between about 200 and about 500 microns or between about 200 and about 400 microns.

In an exemplary embodiment, the solid support is a particle of about 1.5 μm to about 20 μm, e.g., from about 1.9 μm to about 3 μm. In various embodiments, the solid support is about 1.9 μm. In various embodiments, the solid support is about 3 μm.

Generally, substrate particles useful in any packed bed chromatographic application (e.g., LC, HPLC or ultra-pressure chromatography) are suitable for use in the chromatographic media of the invention.

In various examples, the support is in particulate form, and multiple support particles are disposed in a packed bed. For example, a plastic or metal column is packed with the support particles. In an exemplary embodiment, the medium of the invention is composed of two or more chromatographic media of the invention, or a medium of the invention and an art-recognized medium. For example, one chromatographic medium is a medium of the invention and the second medium consists of particles with an ion exchange binding site. In various embodiments, the chromatographic medium is mixed with a second chromatographic medium having RP or HILIC binding sites. As will be appreciated multiple chromatographic media, each with a different binding site, are combinable with the chromatographic medium of the invention.

In various examples, the solid support particles are essentially "homodisperse" or essentially "homodisperse", which indicates that the particle size of the majority of the particles (e.g., 80, 90 or 95% of the particles) does not vary substantially (e.g., not more than 50%) below or above the median particle size (M). In an exemplary monodisperse substrate particle population, 90% of the particles have an average particle size of between about 0.5 times M and about 1.5 times M. In an exemplary embodiment, such a particle has a size from about 1.9 μm to about 3 μm. In various embodiments, such a particle is about 1.9 or about 3 μm.

In another example, the substrate is an inorganic or organic monolith. In one example the solid support includes a silica monolith. In another example, the solid support includes an alumina monolith. In yet another example, the solid support includes a zirconia monolith. In a further example, the solid support includes a titania monolith. Exemplary monolithic materials based on organic compositions and methods of preparing such materials are described in U.S. Pat. Nos. 5,130,343; 5,929,214; 5,728,457; 5,260,094; 6,887,384; 5,334,310; 7,303,671; 5,453,185 and 7,074,331.

An exemplary solid support of use in the present invention is assembled by functionalizing a particle with the desired binding site by reaction between moieties of complementary reactivity on the moiety bearing the binding site and the solid support.

In an exemplary embodiment, the substrate is silica gel. Suitable silica gels include non-porous and/or porous silica particles of different pore sizes, preferably from 20 Å to 3000 Å and more preferably, from 50 Å to 5000 Å, from 60 Å to 2000 Å; and of different particle sizes, such as from 0.2 μm to 1000 μm, or from 0.1 μm to 10,000 μm, or from 1 μm to 50 μm. The surface area range of the silica gel can range from 0.1-1,000 $m^2/g$.

In an exemplary embodiment, the stationary phase of the invention include a silica substrate with a particle size from about 1 to about 25 micron in diameter. In various embodiments, the stationary phase of the invention includes a silica substrate with pores from about 100-2000 Å. In various embodiments, the stationary phase of the invention includes a silica substrate with a surface area of from about 1 to about 500 m²/g.

Exemplary Compositions of the Invention

In yet another exemplary embodiment, in Formula (I), n is 0 and $L^2$ is straight or branched alkyl. In an exemplary embodiment, $L^1$ is $C_3$-$C_{30}$ substituted or unsubstituted alkyl. In an exemplary embodiment, $L^2$ is $C_1$-$C_{25}$ alkyl. For example, a mixed ion exchange/HILIC phase of the invention includes $L^1$, which is a $C_3$ chain and $L^2$, which is $C_1$.

In an exemplary embodiment, $L^2$ is alkyl-substituted or unsubstituted $C_5$-$C_{30}$ alkyl. In an exemplary embodiment, $L^2$ is unsubstituted $C_6$-$C_{25}$ alkyl. In an exemplary embodiment, $L^2$ is unsubstituted $C_6$-$C_{20}$ alkyl. In an exemplary embodiment $L^2$ is $C_6$, $C_7$, $C_8$, $C_9$, $C_{10}$, $C_{11}$, $C_{12}$, $C_{13}$, $C_{14}$ or $C_{15}$ unsubstituted alkyl. An exemplary structure according to this embodiment is provided below:

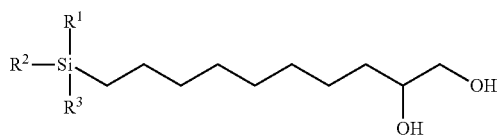

In an exemplary embodiment, at least one of $R^1$, $R^2$ and $R^3$ in Formula (I) is $OR^{10}$ wherein $R^{10}$ represents a bond to the substrate (e.g., silica gel). In an exemplary embodiment, at least two of $R^1$, $R^2$ and $R^3$ in Formula (I) is $OR^{10}$ wherein $R^{10}$ represents a bond to the substrate (e.g., silica gel). Exemplary compositions of the invention have a structure according to Formula (V):

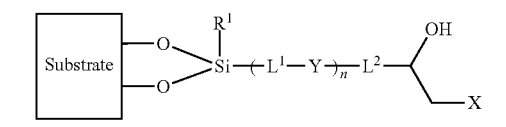

(Va)

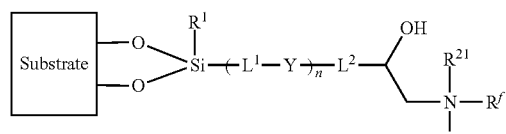

(Vb)

(Vc)

(Vd)

(Ve)

wherein n is an integer selected from 0 and 1 and X, $R^1$, $R^f$, $R^{21}$, $R^{22}$, $L^1$, $L^2$ and Y as well as the substrate are defined as above for Formula (I).

In one embodiment $R^1$ in Formula (V) is a non-reactive silyl group substituent. In an exemplary embodiment, $R^1$ is selected from substituted or unsubstituted alkyl. In one example, $R^1$ is unsubstituted $C_1$-$C_6$ alkyl (e.g., methyl, ethyl, n-propyl, iso-propyl, n-butyl, iso-butyl and the like). In another example, $R^1$ is selected from substituted or unsubstituted alkyl, such as unsubstituted $C_1$-$C_6$ alkyl (e.g., methyl, ethyl, n-propyl, iso-propyl, n-butyl, iso-butyl and the like). In an exemplary embodiment, $R^1$ is methyl. In an exemplary embodiment, $R^1$ is OH.

Exemplary compositions according to Formula (V) include:

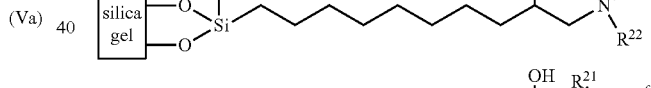

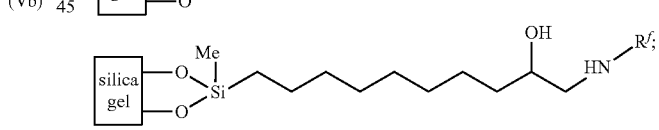

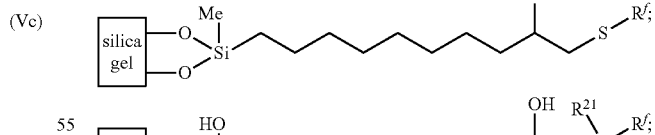

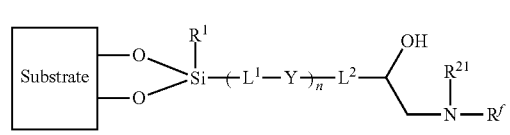

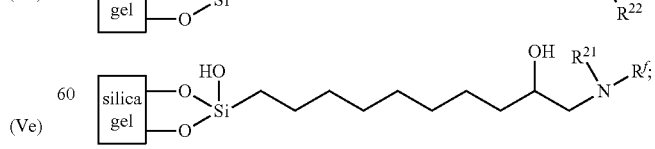

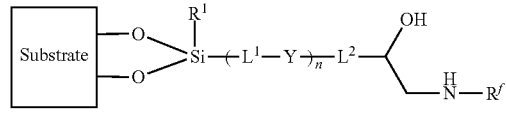

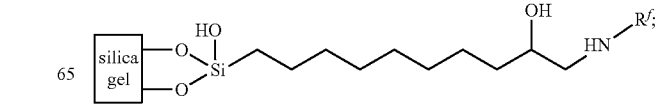

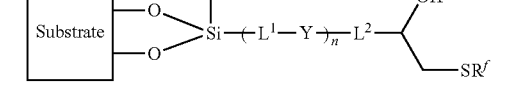

-continued

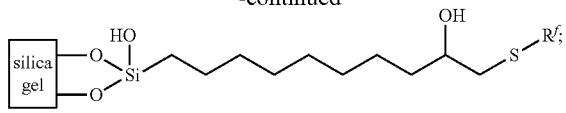

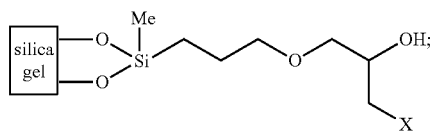

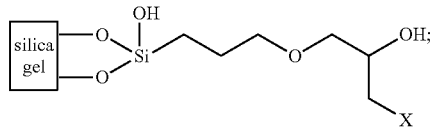

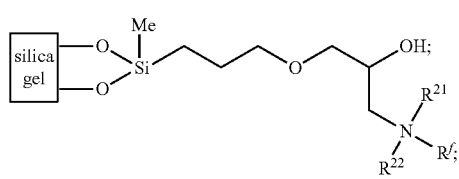

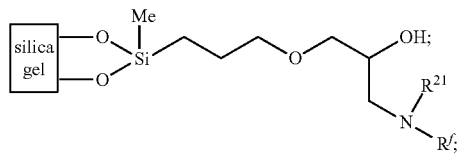

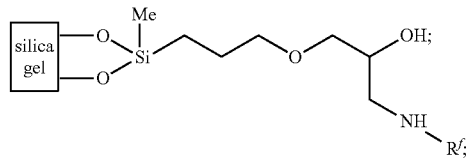

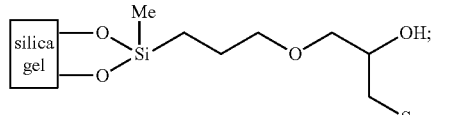

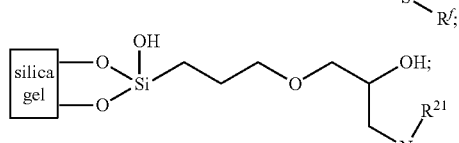

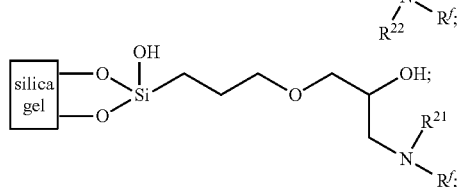

-continued

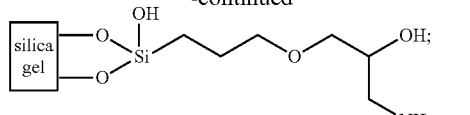

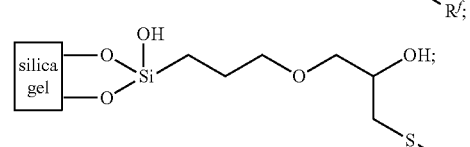

wherein X, $R^f$, $R^{21}$ and $R^{22}$ are as described herein.

As will be apparent to those of skill in the art one or more of the hydroxyl moieties can be an SH moiety, an ether or thioether moiety, e.g., $C_6$-$C_{18}$, e.g., $C_8$-$C_{16}$, e.g., $C_8$, $C_9$, $C_{10}$, $C_{11}$, $C_{12}$, $C_{13}$, $C_{14}$, $C_{15}$ or $C_{16}$. In an exemplary embodiment, the alkyl group is not substituted other than at its point of attachment to the remainder of the molecule, i.e., its O- or S-substitution.

In an exemplary embodiment, $R^f$ is a polyhedral oligomeric silsequioxanes (POSS) moiety. Examples of POSS moieties, and methods of obtaining same, are known in the art and are described in documents such as PCT Patent Application No. PCT/US2012/025049.

In various embodiments, the compound of the invention is formed by first treating the substrate with the desired ligand, e.g., 1. Following the placement of the ligand on the solid support by covalent bonding, the stationary phase can be used as is or, in exemplary embodiments, the ligand-bound substrate is treated with a small reactive molecule to cap reactive groups on the surface of the substrate. Thus, for example OH moieties on a silica substrate can be left exposed following placement of the ligand on the substrate or they can be capped. An exemplary small molecule capping reagent is a reactive silane, e.g., hexamethyldisilazane.

The current invention provides embodiments, in which the compositions of the invention are in a container. The container is preferably a chromatography column. Exemplary chromatography columns include metal columns, glass columns and columns made from a polymeric material, such as plastics. Metal columns may be those commonly used for chromatography procedures employing high pressure (e.g., HPLC). Plastic columns may be those commonly employed for preparative chromatography systems. Such polymeric columns are frequently disposable and are often referred to as cartridges.

IIb. Starting Materials

In a second aspect the invention provides a compound incorporating a reactive silyl group as well as a precursor moiety (which can be converted into a polar head group). Such compounds have the following general formula:

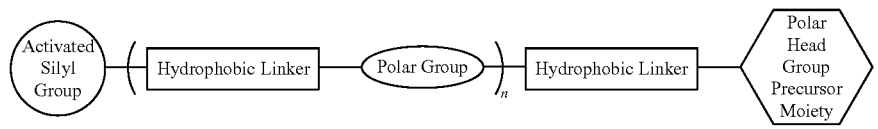

In one embodiment, the compounds incorporate an epoxide or a hydroxyl moiety. The compounds have a structure according to Formulae (VI), wherein n is an integer selected from 0 and 1:

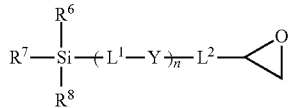

(VI)

In Formulae (VI), $R^6$, $R^7$, $R^8$, n, $L^1$, $L^2$, and Y are as defined herein for Formula (I).

When n is 1, at least one of $L^1$ and $L^2$ in Formula (I) includes a hydrophobic moiety. When n is 0, $L^2$ optionally includes a hydrophobic moiety. In this context, a "hydrophobic moiety" includes a carbon chain having an exemplary number of carbon atoms in sequence, wherein this number is defined by a lower and an upper limit. With respect to the lower limit the hydrophobic moiety has preferably at least 2, at least 3, at least 4, at least 5, at least 6, at least 7, at least 8, at least 9, at least 10, at least 11, or at least 12 carbon atoms in sequence. In an exemplary embodiment, the hydrophobic moiety has at least 7 carbon atoms in sequence. With respect to the higher limit, the hydrophobic moiety includes preferably not more than about 50 carbon atoms in sequence, not more than about 30 carbon atoms, not more than about 25 carbon atoms, not more than about 20 carbon atoms, or not more than about 15 carbon atoms in sequence. Exemplary ranges for the number of carbon atoms in sequence may be formed between the above described higher and lower limits. In yet another embodiment, the hydrophobic moiety includes more than 50 carbon atoms in sequence. In an exemplary embodiment, $L^2$ is derived from the reaction of glycidyl ether bonded silica.

In various embodiments, at least one of $L^1$ and $L^2$ is a carbon chain comprising at least 3 carbon atoms in sequence. In various embodiments, $L^1$ and $L^2$ combined include at least 4, 5, 6, 7, 8, 9, 10, 11, 12, 13, 14, 15, 16, 17, 18, 19 or at least 20 carbon atoms in sequence. In an exemplary embodiment, $L^1$ is a $C_3$ chain. In various embodiments, $L^2$ is $C_1$. In an exemplary embodiment, $L^1$ is a $C_3$ chain and $L^2$ is $C_1$.

In an exemplary embodiment, the compounds of Formulae (VI), are useful as starting materials in the synthesis of the compositions of the invention.

In Formula (VI), $R^6$, $R^7$ and $R^8$ are silyl group substituents and together with the Si atom form an activated silyl group. An activated silyl group includes at least one reactive silyl group substituent. A reactive silyl group substituent is capable of reacting with a substrate of the invention to form a covalent bond between the compound and the substrate. Thus, at least one of $R^6$, $R^7$ and $R^8$ is a reactive silyl group substituent. Exemplary reactive silyl group substituents include alkoxy groups, halogens and primary or secondary amino groups.

In one embodiment, $R^6$, $R^7$ and $R^8$ are members independently selected from halogen, $OR^{14}$, $NR^{14}R^{15}$, $OC(O)R^{16}$, $OS(O)_2R^{16}$, acyl, substituted or unsubstituted alkyl, substituted or unsubstituted heteroalkyl, substituted or unsubstituted aryl, substituted or unsubstituted heteroaryl and substituted or unsubstituted heterocycloalkyl. Each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Each $R^{16}$ is a member independently selected from substituted or unsubstituted alkyl, substituted or unsubstituted heteroalkyl, substituted or unsubstituted aryl, substituted or unsubstituted heteroaryl and substituted or unsubstituted heterocycloalkyl. In an exemplary embodiment, at least one of $R^6$, $R^7$ and $R^8$ is other than OH, unsubstituted alkyl, unsubstituted aryl, unsubstituted heteroaryl and unsubstituted heterocycloalkyl.

In one example, one of $R^6$, $R^7$ and $R^8$ is a non-reactive silyl group substituent. In another example, two of $R^6$, $R^7$ and $R^8$ are non-reactive silyl group substituents. Exemplary non-reactive silyl group substituents include alkyl groups or aryl groups. In an exemplary embodiment, one or two of $R^6$, $R^7$ and $R^8$ are members selected from unsubstituted $C_1$-$C_6$ alkyl (e.g., methyl, ethyl, n-propyl, iso-propyl, n-butyl, iso-butyl and the like). In yet another example, two of $R^6$, $R^7$ and $R^8$ are non-reactive silyl group substituents. For example, two of $R^6$, $R^7$ and $R^8$ are members independently selected from substituted or unsubstituted alkyl, such as substituted or unsubstituted $C_1$-$C_6$ alkyl (e.g., methyl, ethyl, n-propyl, iso-propyl, n-butyl, iso-butyl and the like). In an exemplary embodiment, one or two of $R^6$, $R^7$ and $R^8$ are methyl.

III. Methods

The compositions and compounds of the invention may be synthesized using methods known in the art and those described herein. Exemplary methods are outlined in the Schemes and in the Examples. Variation of those methods may be necessary to synthesize compounds of certain embodiments. Those alternative methods will be apparent to a person of skill in the art. Starting materials and reagents useful for preparing the compositions and compounds of the invention are commercially available or can be prepared using art-recognized methodologies.

Synthesis of Compounds According to Formula (VI) (Starting Materials)

In one embodiment, compounds of Formula (VI) are prepared using a procedure outlined in Scheme 1, below, in which the integer t is a member selected from 0 to 30, preferably from 2 to 20 and most preferably from 2 to 15. In Scheme 1, the terminal double bond of compound 30 is hydrosilylated using a silane in the presence of a catalyst, such as a platinum(0) catalyst, to give compound 31.

Scheme 1

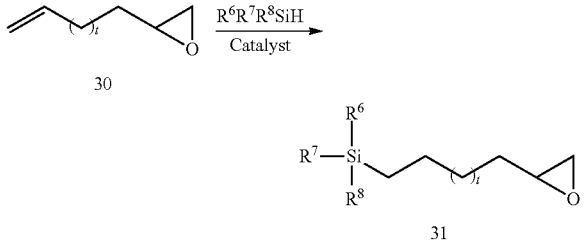

In an exemplary embodiment, a precursor to a ligand of the invention includes a terminal double bond which is oxidized to form an epoxide moiety. Epoxidation reagents are known in the art and include perbenzoic acids, such as meta-chloroperbenzoic acid (m-CPBA). Epoxidation reactions can be performed stereoselectively resulting in chiral products. Chiral epoxides of the invention can be used to synthesize chiral versions of the compositions of the invention useful for chiral chromatography.

Synthesis of Compounds According to Formula (I)

Compounds of Formula (VI) can be covalently attached to a substrate (e.g., silica gel) to form a composition of the invention. In one embodiment, a covalent bond between the substrate and the compound is formed through reaction of the substrate with at least one reactive silyl group substituent of the compound. In an exemplary embodiment, the substrate includes reactive functional groups that react with the reactive silyl group substituent to form a covalent bond. Exemplary reactive functional groups of the substrate include silanol and alkoxy silane groups as well as halosilane and aminosilane moieties.

Typically, reaction between a silica substrate and a compound of the invention is effected by heating a mixture of the compound and a slurry of the silica substrate in an inert solvent (e.g., toluene). For example, the mixture is heated to reflux for from about 0.2 to about 100 hours, preferably from about 1 to about 80 hours, and more preferably from about 1 to about 24 hours. Optionally, a coupling catalyst is added to control the density of the bonded groups on the surface of the substrate as well as the morphology of the resulting phase. Exemplary coupling catalysts include water as well as organic and inorganic acids (e.g., HCl) and bases (NaOH, amines).

The above described coupling procedure results in intermediate compositions incorporating a polar head group precursor moiety, such as an epoxide or a hydroxy moiety. In one embodiment, the intermediate composition has a structure according to Formula (VII):

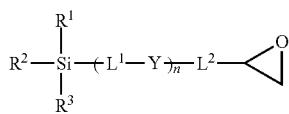

(VII)

In one example the intermediate compositions have a structure according to Formulae (VIII):

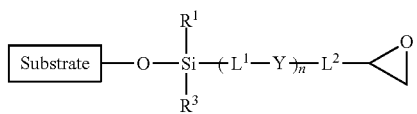

(VIII)

The above intermediate compositions of Formulae (VII) and (VIII) are expected to be useful as stationary phases in chromatography and are within the scope of the current invention.

The intermediate compositions of the invention may be converted to compositions of the invention, for example those of Formula (I), through conversion of the polar head group precursor to a polar head group, such as —CH(OH)(CH$_2$X). In one embodiment, the epoxide moiety of Formula (VII) or Formula (VIII) is converted to —CH(OH)(CH$_2$X). It is well within the abilities of a skilled person to carry out such a reaction. For example, acid catalyzed hydrolysis can be carried out by treating the intermediate composition with an aqueous solution containing an organic (e.g., formic acid) or inorganic acid.

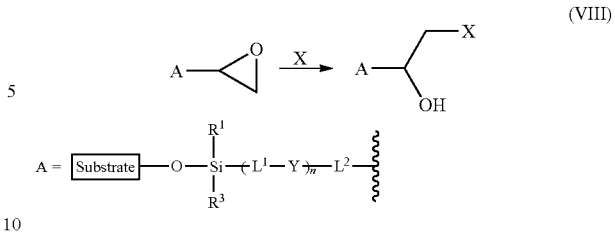

(VIII)

Accordingly, the invention provides methods of making a composition of the invention. In one embodiment, the method includes: (i) contacting a substrate (e.g., silica gel) having a reactive functional group (e.g., a silanol group) with a compound having an epoxide moiety and having a structure according to Formula (VI):

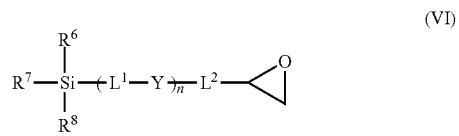

(VI)

wherein n, $R^6$, $R^7$, $R^8$, $L^1$, $L^2$, and Y are defined herein for Formula (VI), under conditions sufficient to form a covalent bond between the compound and the substrate through reaction between the reactive functional group of the substrate and at least one of $R^6$, $R^7$ and $R^8$. The method may further include (ii) converting the epoxide moiety into an 1,2-diol moiety, for example, by acid-catalyzed hydrolysis or by opening of the epoxide ring using a nucleophilic reagent as described above. In an exemplary embodiment, at least one of $R^6$, $R^7$ and $R^8$ is halogen or alkoxy (e.g., methoxy or ethoxy).

In an exemplary embodiment, the invention provides a chromatographic stationary support that includes a cross-link formed by components of the compound of Formulae I or II. In an exemplary embodiment, the cross-link results in the formation of a dense, neutral hydrophilic layer covering the substrate. When the substrate is silica, this hydrophilic layer masks the silanol groups on the substrate surface. In various embodiments, the cross-link is formed by reaction between hydroxyl moiety and an epoxide on the same or on different moieties according to Formula I, which are bound to a substrate, and/or a bifunctional reagent. In an exemplary embodiment, either or both the hydroxyl moiety and epoxide moiety are derived from a bifunctional reagent having at least one hydroxyl moiety and at least one epoxide moiety, e.g., glycerol diglycidyl ether, which is contacted with a compound of the invention, e.g., of Formula I or Formula II. As will be apparent to those of skill in the art, the epoxide moiety of the bifunctional reagent can react with a hydroxyl of the ligand bound to the substrate and the hydroxyl of the bifunctional reagent can react with an epoxide on the ligand bound to the substrate and vice versa. See, FIG. 14B

In an exemplary embodiment, the invention provides a cross-linked chromatographic stationary support formed by a method comprising: (a) contacting a substrate with a first ligand comprising a first epoxide moiety under conditions appropriate for binding the first ligand to the substrate; (b) contacting the product of step (a) with a bifunctional reagent having at least one hydroxyl moiety and at least a second epoxide moiety under basic conditions, thereby forming a cross-link by reacting said hydroxyl moiety with a member selected from the first epoxide moiety, the second epoxide moiety and a combination thereof; and optionally, (c) contacting the product of step (b) with an epoxide reagent under conditions appropriate to react said epoxide with a hydroxyl moiety on the product of step (b).

In an exemplary embodiment, only steps (b) and (c) are practiced and the starting material for step (b) is purchased or manufactured prior to forming the cross-linked stationary phase of this embodiment. In an exemplary embodiment, only step (b) is practiced and the product of step (b) is not contacted with the epoxide reagent.

In various embodiments, the reaction of step (b) is performed under basic conditions. The base is an inorganic base (e.g., OH—) or an organic base (e.g., 1,5,7-triazabicyclo[4.4.0]dec-5-ene. In various embodiments, the reaction of step (c) is carried out using boron trifluoride etherate.

Chromatographic Methods

In another embodiment, the invention provides a chromatographic method comprising flowing a mobile phase through a stationary phase comprising a composition of the invention, such as those of Formula (I). In one example, the mobile phase is a liquid. In an exemplary embodiment, the mobile phase includes water. The water content of the mobile phase is preferably between about 0.1% v/v and 60% v/v, more preferably between about 1% and about 20% v/v, even more preferably between about 1% and about 10% v/v and most preferably between about 1% and about 5% v/v.

In another embodiment, the invention provides a method of separating analytes in a liquid sample comprising flowing the liquid sample through a stationary phase comprising a composition of the invention. In an exemplary embodiment, the liquid sample includes water. The water content of the liquid sample is preferably between about 0.1% v/v and 60% v/v, more preferably between about 1% and about 20% v/v, even more preferably between about 1% and about 10% v/v and most preferably between about 1% and about 5% v/v.

V. Devices and Systems

The invention also provides devices and systems incorporating the chromatographic media of the invention. Thus, in an exemplary embodiment, the chromatographic medium is in a flow-through bed suitable for use as a chromatographic device. In an exemplary embodiment, the invention provides a chromatography column packed with the chromatographic medium of the invention.

In an exemplary embodiment, the device is a column packed with a chromatographic medium of the invention. The column hardware in one embodiment of the invention includes rigid tubes to be used as chromatographic columns, with various shapes including cylindrical, conical, rectangular, and polygonal or an assembly of these tubes. The tube may be made from any conventional materials know in the art including metal, glass, silica, plastic or other polymers, more preferably the stainless steel or glass. The inner dimension of this tube can be from micrometers to meters in diameter, thickness, width, or depth. The chromatographic medium may span the entire cross-section area of the tube where the separation of the samples take place by passing through the tube axially or radially (Lee, W-C, et al, "Radial Flow Affinity Chromatography for Trypsin Purification", Protein Purification (book), ACS Symposium Series 427, Chapter 8, American Chemical Society, Washington, D.C., 1990.) depending on the mode of separation, more specifically the axial or direct flow chromatography or the radial flow chromatography. The inner surface of the column may be non-reactive or may be treated to increase adhesion to the surface of chromatographic medium. The tube can incorporate any usable fittings know in the art to connect it with other instruments, more specifically chromatography instruments.

In various embodiments, the invention provides a chromatographic system. In an exemplary embodiment, the system is a high performance liquid chromatography (HPLC) system. Exemplary systems include one or more separation device, which contains a chromatographic medium of the invention. An exemplary system includes one or more separation device in line and in fluidic communication with one or more device for regulating eluent supply to the separation device, e.g., an eluent generator, a pump; one or more detection device, e.g., a mass spectrometric and/or fluorescence detector; and one or more means of introducing a sample on to the separation device, e.g., a sample injection valve.

By way of illustration, exemplary systems for HPLC analysis typically include a chromatographic separation zone using an eluent containing an electrolyte, and an eluent suppression stage, followed by detection, typically performed by mass spectrometer or a fluorescence detector. In the chromatographic separation stage, glycan components of an injected sample are eluted from a separation column.

Eluent is supplied from a source, which can includes a vessel containing premade eluent or it can be generated by an eluent generator. Eluent generators are known in the art. An exemplary eluent generator is disclosed in U.S. Pat. No. 7,767,462.

The invention is further illustrated by the Examples that follow. The Examples are not intended to define or limit the scope of the invention.

EXAMPLES

Example 1

Preparation of Oxirane Functionalized Silica

Figure 4:
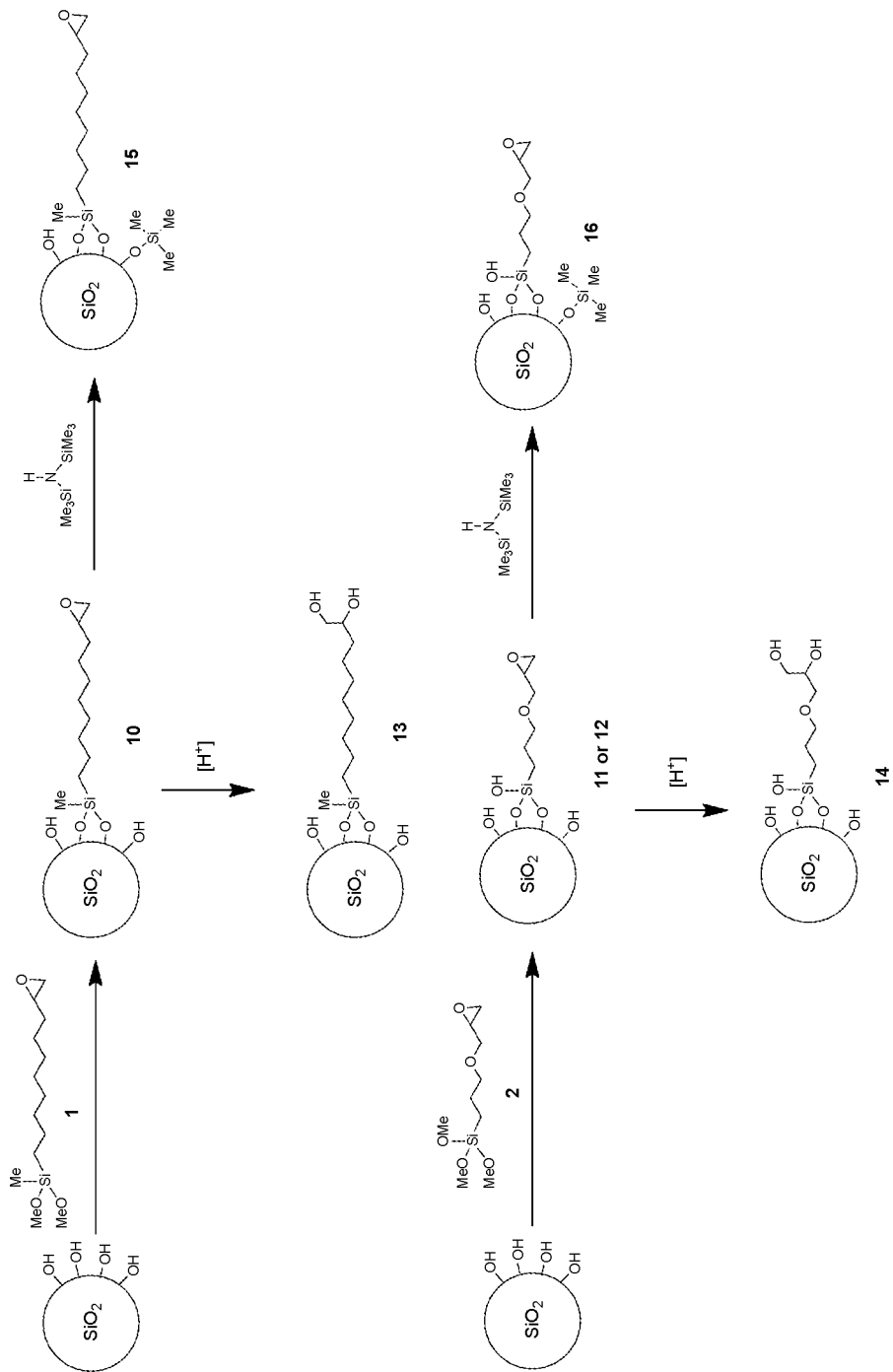
FIG. 4 illustrates the preparation of phases 10-16.

Preparation of Phase 10 and Phase 15 (FIG. 4)

20 g of dried porous spherical silica particles (particle size, 5-μm; pore size, 120-Å; surface area, 300 m$^2$/g) were weighed in a 250-mL round bottom flask. Then a solution of silyl ligand 1 (20 g) in toluene (50 mL) was added to the flask. After carefully dispersing above slurry, the reaction mixture was put under stable refluxing and stirring for 48 hours. The functionalized silica particles were filtered and thoroughly washed with acetone to give Phase 10.

10 g of dried Phase 10 was weighed in a 250-mL round bottom flask. Then 20 g hexamethyldisilazane (e.g., Gelest) and toluene (50 mL) were added to the flask. After carefully dispersing above slurry, the reaction mixture was put under stable refluxing and stirring for 48 hours. The resulting silica particles were filtered and thoroughly washed with acetone, and finally dried under vacuum at 50° C. for 2 hours to give Phase 15.

Example 2

Preparation of Glycidyl Ether Functionalized Silica

Preparation of Phase 11 and Phase 16 (FIG. 4)

20 g of dried porous spherical silica particles (particle size, 5-μm; pore size, 120-Å; surface area, 300 m$^2$/g) were weighed in a 250-mL round bottom flask. Then a solution of silyl ligand 2 (20 g) in toluene (50 mL) was added to the flask. After carefully dispersing above slurry, the reaction mixture was put under stable refluxing and stirring for 48 hours. The functionalized silica particles were filtered and thoroughly washed with acetone to give Phase 11.

10 g of dried Phase 11 was weighed in a 250-mL round bottom flask. Then 20 g hexamethyldisilazane (e.g., Gelest) and toluene (50 mL) were added to the flask. After carefully dispersing above slurry, the reaction mixture was put under stable refluxing and stirring for 48 hours. The resulting silica particles were filtered and thoroughly washed with acetone, and finally dried under vacuum at 50° C. for 2 hours to give Phase 16.

Example 3

Preparation of Phase 12 (FIG. 4)

20 g of dried porous spherical silica particles (particle size, 5-µm; pore size, 300-Å; surface area, 100 $m^2/g$) were weighed in a 250-mL round bottom flask. Then a solution of silyl ligand 2 (10 g) was added in toluene (50 mL) to the flask. After carefully dispersing above slurry, the reaction mixture was put under stable refluxing and stirring for 48 hour. The functionalized silica particles were filtered and thoroughly washed with acetone to give Phase 12.

Example 4

Preparation of Hydroxyl Functionalized Silica

Preparation of Phase 13 (FIG. 4)

10 g of Phase 10 was weighed in a 250-mL plastic bottle with a screw cap. Then an aqueous solution containing 1% sodium dodecyl sulfate and 0.1% phosphoric acid was added to the bottle. After carefully dispersing the mixture till uniformity, the capped bottle was put on a rotating tumbler at ambient temperature for 20 hours. The treated silica particles were filtered and thoroughly washed with acetone to give Phase 13.

Example 5

Preparation of Phase 14 (FIG. 4)

10 g of Phase 11 was weighed in a 250-mL a plastic bottle with a screw cap. Then an aqueous solution containing 1% sodium dodecyl sulfate and 0.1% phosphoric acid was added to the bottle. After carefully dispersing the mixture till uniformity, the capped bottle was put on a rotating tumbler at ambient temperature for 20 hours. The treated silica particles were filtered and thoroughly washed with acetone to give Phase 14.

Example 6

Figure 5:
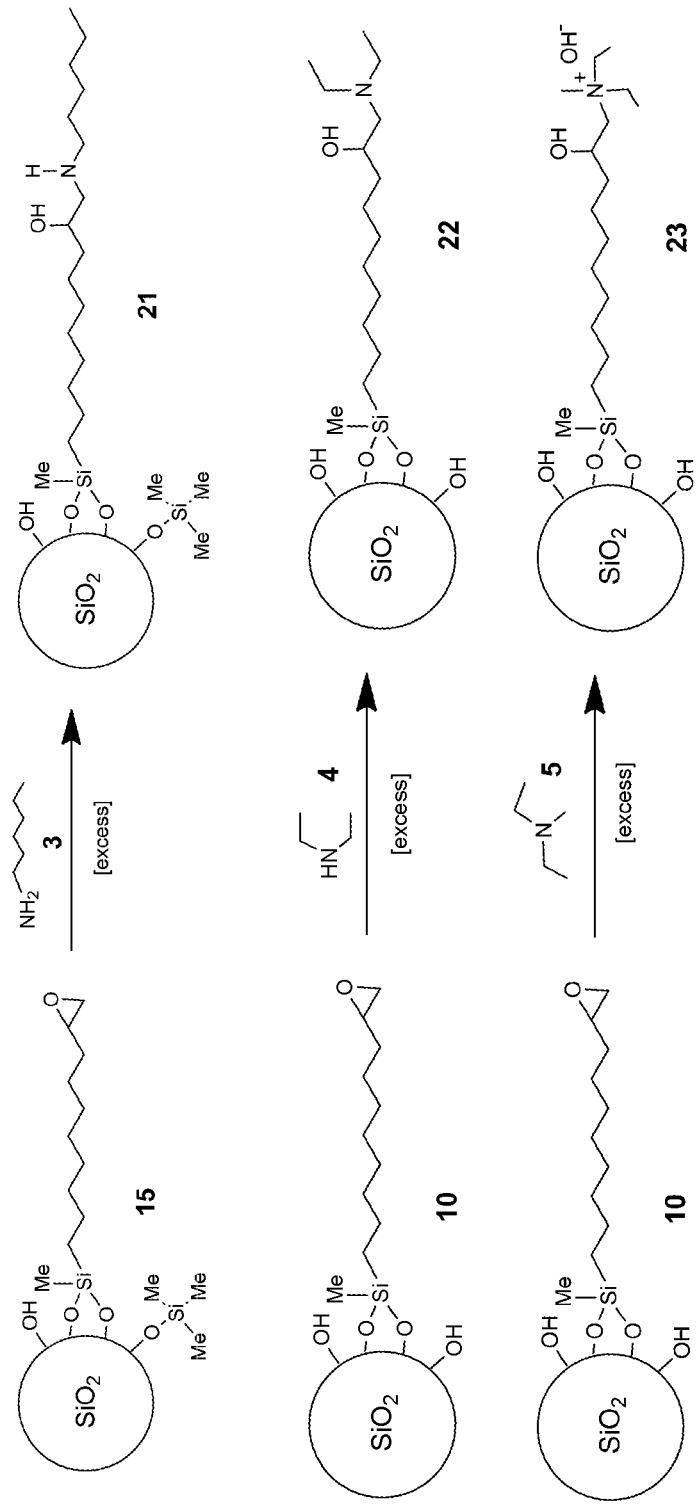
FIG. 5 illustrates the preparation of phases 21-23.

Preparation of Phase 21 (FIG. 5)

4.0 mL of hexylamine (3) in 20 mL of D.I. water was dissolved in a 40-mL glass vial to make a uniform solution. 4.0 g of Phase 15 was added to the vial and sealed with a screw cap. The resulting mixture was mixed till uniformity. The reaction mixture was kept at 50° C. with gentle tumbling for 40 min. The reaction mixture was filtered followed by washing the cake with methanol (50 mL), 0.1% phosphoric acid aqueous solution (200 mL), D.I. water (50 mL) and acetonitrile (100 mL) to give Phase 21.

Example 7

Preparation of Phase 22 (FIG. 5)

4.0 mL of diethylamine (4) in 20 mL of D.I. water was dissolved in a 40-mL glass vial to make a uniform solution. 4.0 g of Phase 10 was added to the vial and seal it with a screw cap. The resulting mixture was mixed till uniformity. The reaction mixture was kept at 50° C. with gentle tumbling for 40 min. The reaction mixture was filtered followed by washing the cake with methanol (50 mL), 0.1% phosphoric acid aqueous solution (200 mL), D.I. water (50 mL) and acetonitrile (100 mL) to give Phase 22.

Example 8

Preparation of Phase 23 (FIG. 5)

4.0 mL of diethylmethylamine (5) in 20 mL of D.I. water was dissolved in a 40-mL glass vial to make a uniform solution. 4.0 g of Phase 10 was added to the vial and seal it with a screw cap. The resulting mixture was mixed till uniformity. The reaction mixture was kept at 50° C. with gentle tumbling for 40 min. The reaction mixture was filtered followed by washing the cake with methanol (50 mL), 0.1% phosphoric acid aqueous solution (200 mL), D.I. water (50 mL) and acetonitrile (100 mL) to give Phase 23.

Example 9

Figure 6:
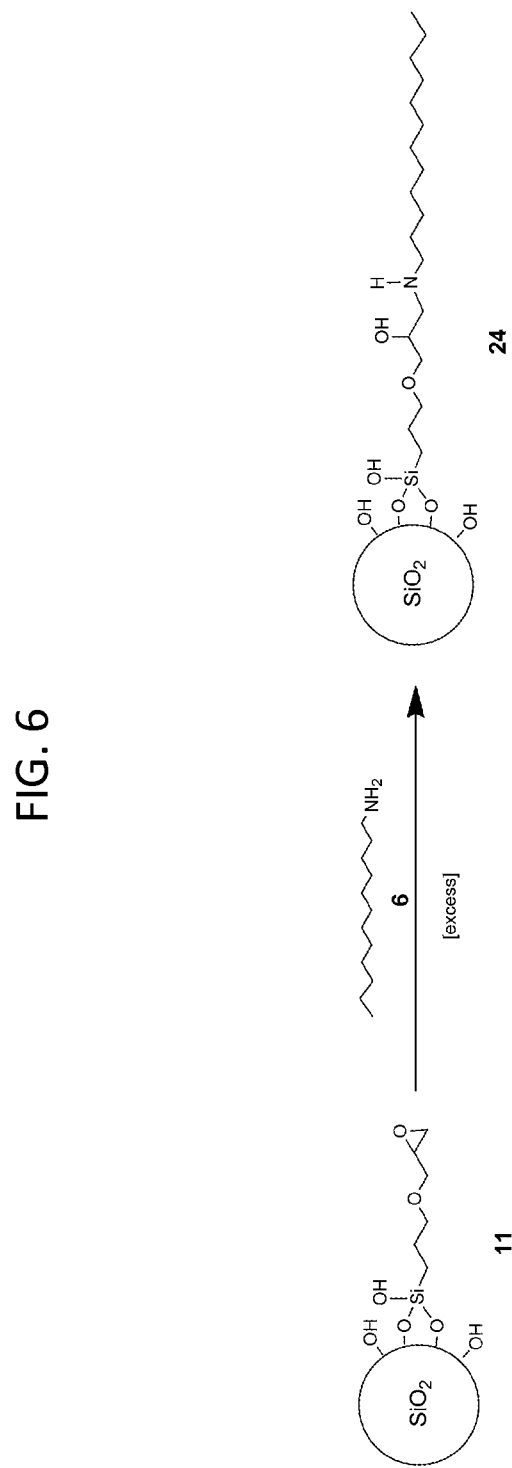
FIG. 6 illustrates the preparation of phase 24.

Preparation of Phase 24 (FIG. 6)

2.0 g of Phase 11 in 10 mL of DMF was dispersed in a 20-mL vial with a screw cap. 2.0 mL of dodecylamine (6) was weighed and added to 10 mL of DMF in a 40-mL glass vial with a screw cap. Separately these two mixtures were sonicated till uniformity then, mixed together in the 40-mL vial. After 10 g of D.I. water was added to above mixture, the reaction mixture was kept at 50° C. with gentle tumbling for 120 min. The reaction mixture was filtered followed by washing the cake with methanol (50 mL), 0.1% phosphoric acid aqueous solution (200 mL), D.I. water (50 mL) and acetonitrile (100 mL) to give Phase 24.

Example 10

Figure 7:
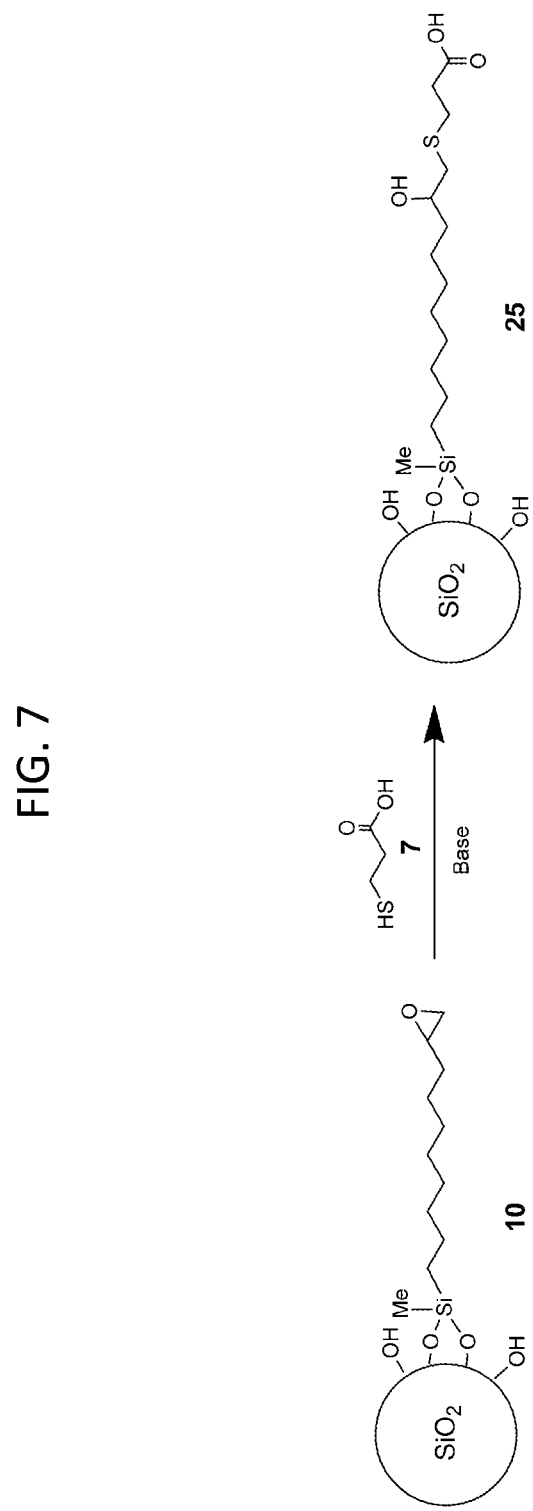
FIG. 7 illustrates the preparation of phase 25.

Preparation of Phase 25 (FIG. 7)

4.0 g of Phase 10 (vacuum oven dried at 50° C. for 20 hours), 2.0 mL of triisopropylamine, and 1.0 g of 3-mercaptoprionic acid (7) were added to 20 mL of DMF (anhydrous) in a 40-mL glass vial with a screw cap. After sealing the vial with the cap, the slurry was mixed well till uniformity. The reaction mixture was kept at 80° C. with gentle mixing for 20 hours. The reaction mixture was filtered followed by washing the cake with acetone (50 mL), 0.1% phosphoric acid aqueous solution (200 mL), D.I. water (50 mL) and acetonitrile (100 mL) to give Phase 25.

Example 11

Figure 8:
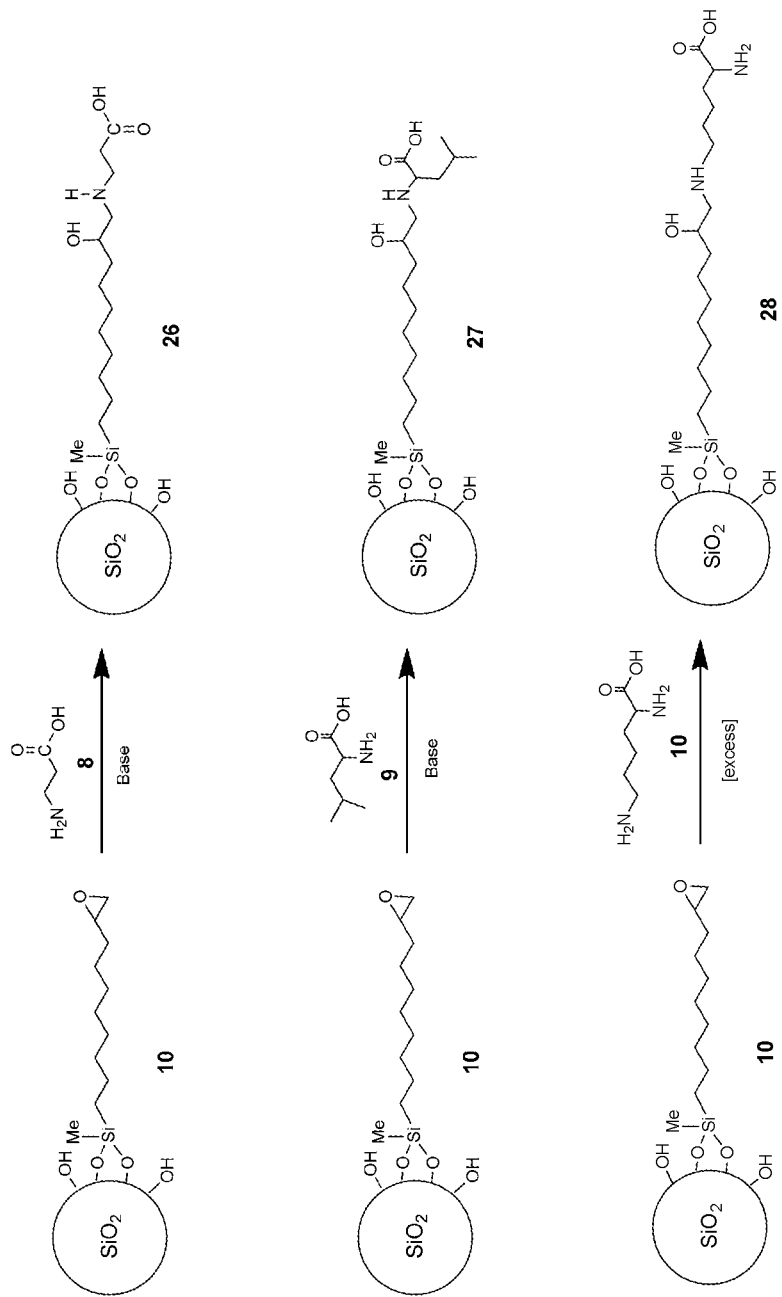
FIG. 8 illustrates the preparation of phases 26-28.

Preparation of Phase 26 (FIG. 8)

4.0 g of Phase 10 (vacuum oven dried at 50° C. for 20 h), 2.0 mL of triisopropylamine, and 1.0 g of β-alanine (8) in a solution containing 10 mL of D.I. water and 10 mL of DMF were added to a 40-mL glass vial with a screw cap. After sealing the vial with the cap, the slurry was mixed well till uniformity. The reaction mixture was kept at 50° C. with gentle mixing for 60 min. The reaction mixture was filtered followed by washing the cake with acetone (50 mL), 0.1% phosphoric acid aqueous solution (200 mL), D.I. water (50 mL) and acetonitrile (100 mL) to give Phase 26.

Example 12

Preparation of Phase 27 (FIG. 8)

2.0 g of Phase 10 (vacuum oven dried at 50° C. for 20 h) was dispersed in 10 mL of DMF (anhydrous) in a 20-mL vial with a screw cap. 2.0 mL of triisopropylamine, and 2.5 g of leucine (9) in a solution containing 10 mL of D.I. water and 10 mL of DMF were added to a 40-mL glass vial with a screw cap. Separately these two mixtures were sonicated till uniformity before mixing them together in the 40-mL vial. The reaction mixture was kept at 50° C. with gentle tumbling for 60 min. The reaction mixture was filtered followed by washing the cake with acetone (50 mL), 0.1% phosphoric acid aqueous solution (200 mL), D.I. water (50 mL) and acetonitrile (100 mL) to give Phase 27.

Example 13

Preparation of Phase 28 (FIG. 8)

2.0 g of lysine (10) in 20 mL of D.I. water was dissolved in a 40-mL glass vial to make a uniform solution. 2.0 g of Phase 10 (vacuum oven dried at 50° C. for 20 h) was added to the vial and sealed with a screw cap. The resulting mixture was mixed till uniformity. The reaction mixture was kept at 50° C. with gentle tumbling for 40 min. The reaction mixture was filtered followed by washing the cake with acetone (50 mL), 0.1% phosphoric acid aqueous solution (200 mL), D.I. water (50 mL) and acetonitrile (100 mL) to give Phase 28.

Example 14

Figure 9:
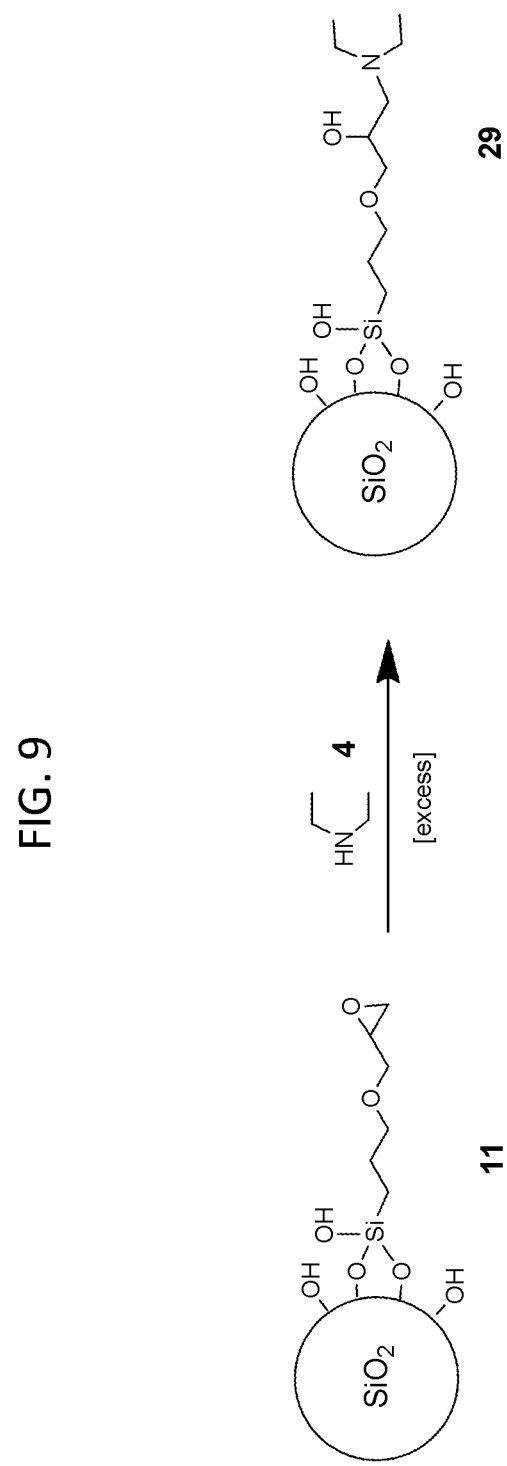
FIG. 9 illustrates the preparation of phase 29.

Preparation of Phase 29 (FIG. 9)

5.0 mL of diethylamine (4) (40% w/w in water) in 20 mL of D.I. water was dissolved in a 40-mL glass vial to make a uniform solution. 4.0 g of Phase 11 (vacuum oven dried at 50° C. for 20 h) was added to the vial and sealed with a screw cap. The resulting mixture was mixed till uniformity. The reaction mixture was kept at 50° C. with gentle tumbling for 40 min. The reaction mixture was filtered followed by washing the cake with methanol (50 mL), 0.1% phosphoric acid aqueous solution (200 mL), D.I. water (50 mL) and acetonitrile (100 mL) to give Phase 29.

Example 15

Figure 10:
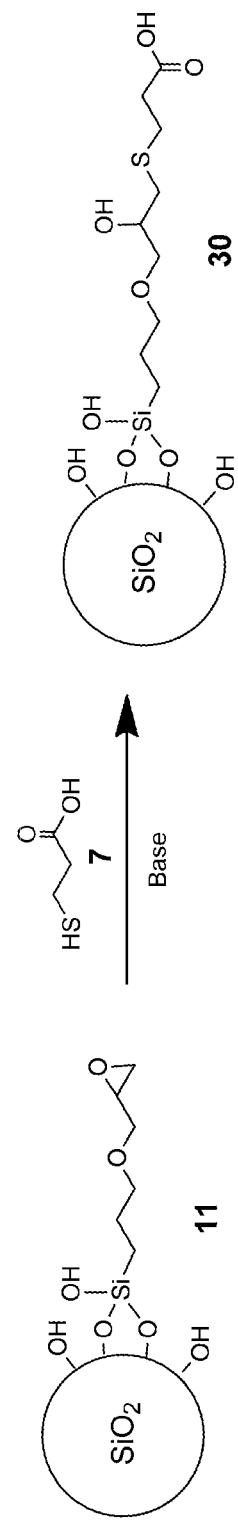
FIG. 10 illustrates the preparation of phase 30.

Preparation of Phase 30 (FIG. 10)

4.0 g of Phase 11 (vacuum oven dried at 50° C. for 20 h), 3.0 mL of triisopropylamine, and 1.0 g of 3-mercaptoproprionic acid (7) in 20 mL of DMF (anhydrous) were added to a 40-mL glass vial with a screw cap. After sealing the vial with the cap, the slurry was mixed well till uniformity. The reaction mixture was kept at 80° C. with gentle mixing for 20 h. The reaction mixture was filtered followed by washing the cake with methanol (50 mL), 0.1% phosphoric acid aqueous solution (200 mL), D.I. water (50 mL) and acetonitrile (100 mL) to give Phase 30.

Example 16

Figure 11:
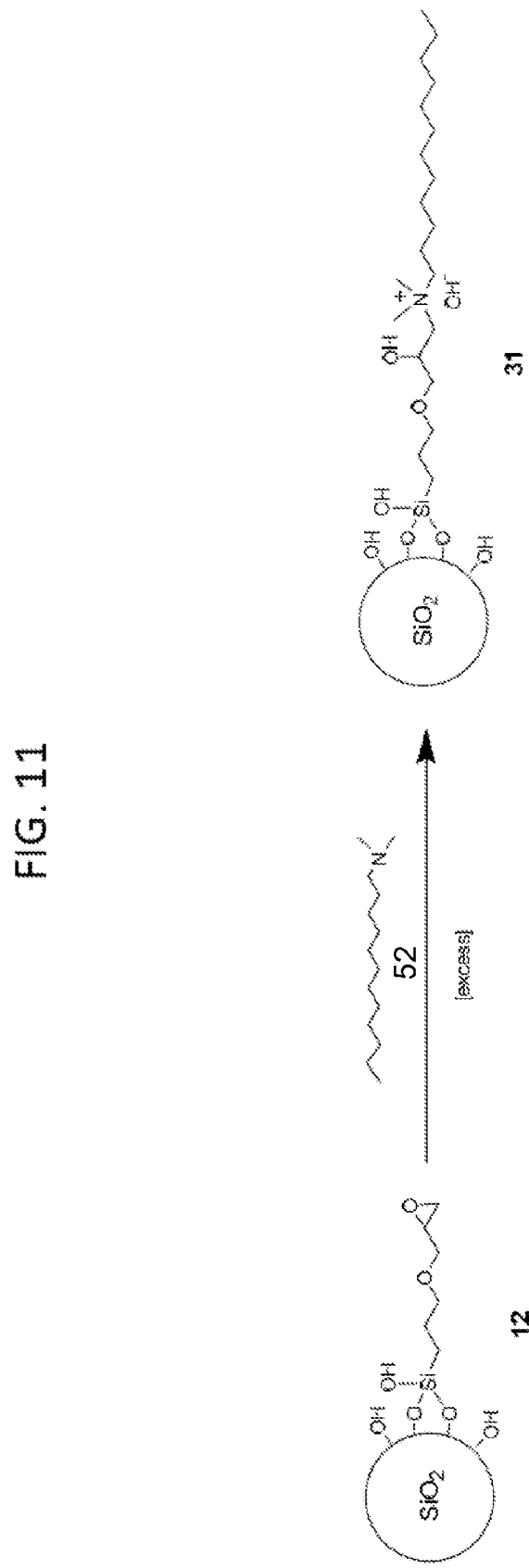
FIG. 11 illustrates the preparation of phase 31.

Preparation of Phase 31 (FIG. 11)

4.0 mL of N,N-dimethyldodecylamine (52) in 20 mL of D.I. water was dissolved in a 40-mL glass vial to make a uniform solution. 4.0 g of Phase 12 (vacuum oven dried at 50° C. for 20 h) was added to the vial and sealed with a screw cap. The resulting mixture was mixed till uniformity. The reaction mixture was kept at 50° C. with gentle tumbling for 40 min. The reaction mixture was filtered followed by washing the cake with acetone (50 mL),), 0.1% phosphoric acid aqueous solution (200 mL), D.I. water (50 mL) and acetonitrile (100 mL) to give Phase 31.

Example 17

Preparation for Ligand 1

To a stirred solution of 50 g 1,2-epoxy-9-decene (e.g., Aldrich), 100 g of $(MeO)_2MeSiH$ (e.g., Gelest) in 30 mL of toluene in a 1-L round bottom flask at ambient temperature were carefully added 0.5 g of Pt(0) catalyst (0.1% wt) (e.g., Gelest). Occasionally, an exothermic reaction was observed upon addition of the catalyst. The flask was equipped with a condenser and the reaction mixture was heated to 50° C. for 8 h. The reaction was monitored using gas chromatography. When the conversion was found to be higher than 60% by GC, all volatiles were removed in vacuo. Ligand 1 was obtained by Kugelrohr Distillation (140° C./0.11 torr) and is illustrated in FIG. 4.

Example 18

Preparation for Ligand 41

Figure 28:
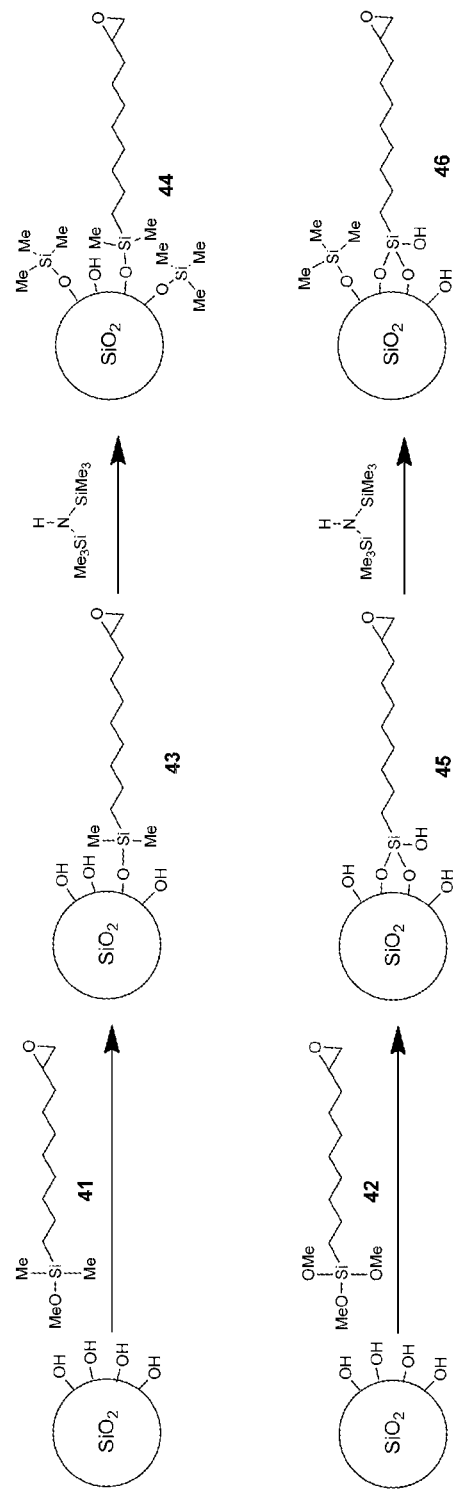
FIG. 28 illustrates the preparation of phases 43-46.

To a stirred solution of 50 g 1,2-epoxy-9-decene (e.g., Aldrich), 100 g of $(MeO)Me_2SiH$ (e.g., Gelest) in 30 mL of toluene in a 1-L round bottom flask at ambient temperature were carefully added 0.5 g of Pt(0) catalyst (0.1% wt) (e.g., Gelest). Occasionally, an exothermic reaction was observed upon addition of the catalyst. The flask was equipped with a condenser and the reaction mixture was heated to 50° C. for 8 h. The reaction was monitored using gas chromatography. When the conversion was found to be higher than 60% by GC, all volatiles were removed in vacuo. Ligand 41 was obtained by Kugelrohr Distillation (120° C./0.05 torr) and is illustrated in FIG. 28.

Example 19

Preparation for Ligand 42

To a stirred solution of 50 g 1,2-epoxy-9-decene (e.g., Aldrich), 100 g of $(MeO)_3SiH$ (e.g., Gelest) in 30 mL of toluene in a 1-L round bottom flask at ambient temperature can be carefully added to 0.5 g of Pt(0) catalyst (0.1% wt) (e.g., Gelest). Occasionally, an exothermic reaction may be observed upon addition of the catalyst. The flask can be equipped with a condenser and the reaction mixture can be heated to 50° C. for 8 h. The reaction can be monitored using gas chromatography. When the conversion is found to be higher than 60% by GC, all volatiles can be removed in vacuo. Ligand 42 can then be obtained by Kugelrohr Distillation (160° C./0.05 torr) and is illustrated in FIG. 28.

Example 20

Preparation of Phase 43 and Phase 44 (FIG. 28)

20 g of dried porous spherical silica particles (particle size, 5-μm; pore size, 120-Å; surface area, 300 m$^2$/g) was weighed in a 250-mL round bottom flask. Then a solution of silyl ligand 41 (20 g) in toluene (50 mL) was added to the flask. After carefully dispersing above slurry, the reaction mixture was put under stable refluxing and stirring for 48 hours. The functionalized silica particles were filtered and thoroughly washed with acetone to give Phase 43.

10 g of dried Phase 43 was weighed in a 250-mL round bottom flask. Then add 20 g hexamethyldisilazane (e.g., Gelest) and toluene (50 mL) to the flask. After carefully dispersing above slurry, the reaction mixture was put under stable refluxing and stirring for 48 hours. The resulting silica particles were filtered and thoroughly washed with acetone, and finally dried under vacuum at 50° C. for 2 hours to give Phase 44.

Example 21

Preparation of Phase 45 and Phase 46 (FIG. 28)

20 g of dried porous spherical silica particles (particle size, 5-μm; pore size, 120-Å; surface area, 300 m²/g) can be weighed in a 250-mL round bottom flask. Then a solution of silyl ligand 42 (20 g) in toluene (50 mL) can be added to the flask. After carefully dispersing above slurry, the reaction mixture can be put under stable refluxing and stirring for 48 hours. The functionalized silica particles can be filtered and thoroughly washed with acetone to give Phase 45.

Weigh 10 g of dried Phase 45 in a 250-mL round bottom flask. Then add 20 g hexamethyldisilazane (e.g., Gelest) and toluene (50 mL) to the flask. After carefully dispersing above slurry, the reaction mixture can be put under stable refluxing and stirring for 48 hours. The resulting silica particles can be filtered and thoroughly washed with acetone, and finally dried under vacuum at 50° C. for 2 hours to give Phase 46.

Example 22

Figure 12:
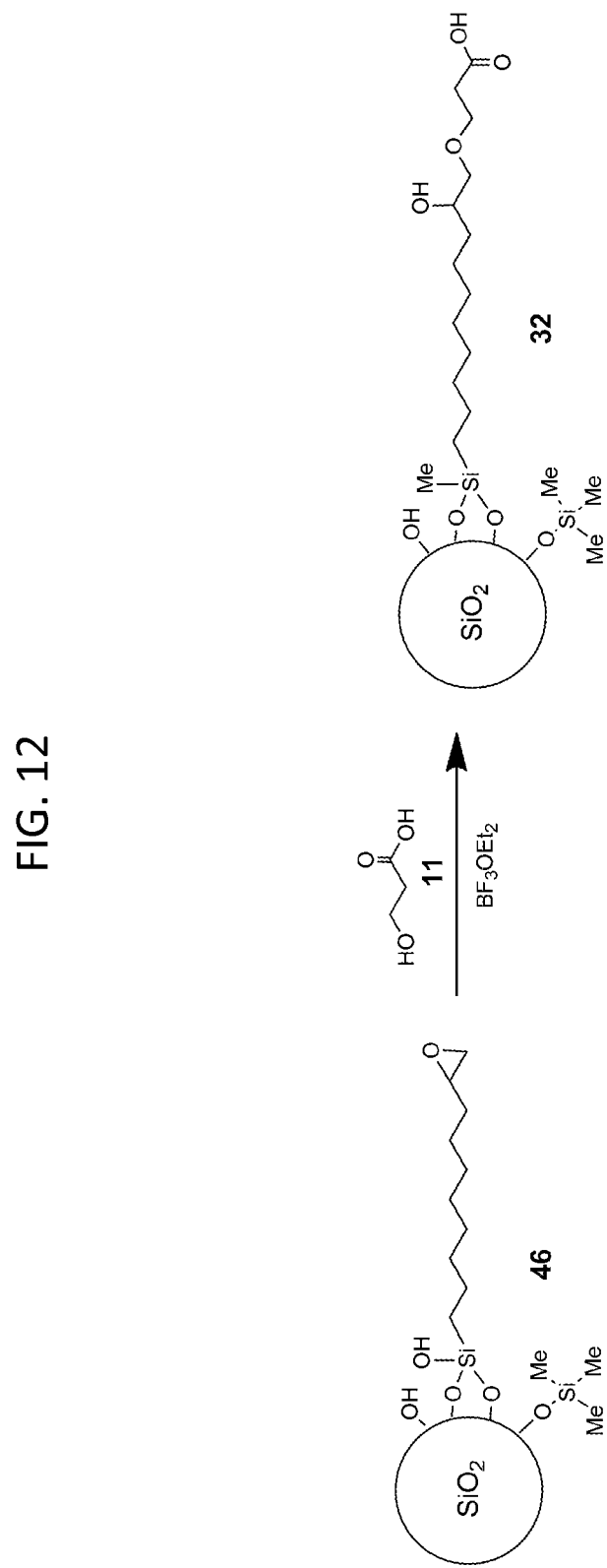
FIG. 12 illustrates the preparation of phase 32.

Preparation of Phase 32 (FIG. 12)

2.0 g of Phase 46 (vacuum oven dried at 50° C. for 20 h), 2.0 g of 3-Hydroxyproprionic acid (11) (which can be stoichiometrically neutralized with triisopropylamine) and 20 mL of DMF (anhydrous) can be weighed in a 40-mL glass vial with a septa cap. After sealing the vial with the cap, mix the slurry well till uniformity, add 0.1 mL of $BF_3 \cdot Et_2O$ through the septum with a syringe. Keep the reaction mixture at ambient temperature with gentle mixing for 30 min. The reaction mixture can be filtered followed by washing the cake with acetone (50 mL), 0.1% phosphoric acid aqueous solution (200 mL), D.I. water (50 mL) and acetone (100 mL) to give Phase 32.

Example 23

Figure 13:
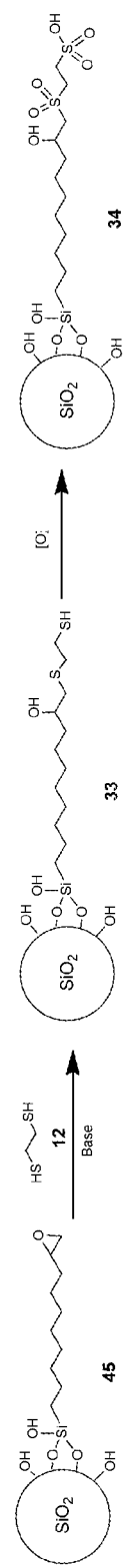
FIG. 13 illustrates the preparation of phases 33 and 34.

Preparation of Phase 33 and Phase 34 (FIG. 13)

4.0 g of Phase 45 (vacuum oven dried at 50° C. for 20 h), 4.0 g of 1,2-ethanedithiol (12) and 2.0 g of triisopropylamine in 20 mL of DMF (anhydrous) can be added to a 40-mL glass vial with a screw cap. After sealing the vial with the cap, mix the slurry well till uniformity. Keep the reaction mixture at 80° C. with gentle mixing for 20 hours. The reaction mixture can be filtered followed by washing the cake with acetone (50 mL), 0.1% phosphoric acid aqueous solution (200 mL), D.I. water (50 mL) and acetonitrile (100 mL) to give Phase 33.

Then disperse Phase 33 into 10 mL glacial acetic acid and 10 mL of hydrogen peroxide (35% a.q.) in a 40-mL glass vial with a screw cap. After sealing the vial with the cap, mix the slurry well till uniformity. Keep the reaction mixture at 90° C. with gentle mixing for 20 hours. The reaction mixture can be filtered followed by washing the cake with acetone (50 mL), D.I. water (50 mL) and acetonitrile (100 mL) to give Phase 34.

Example 24

Figure 14:
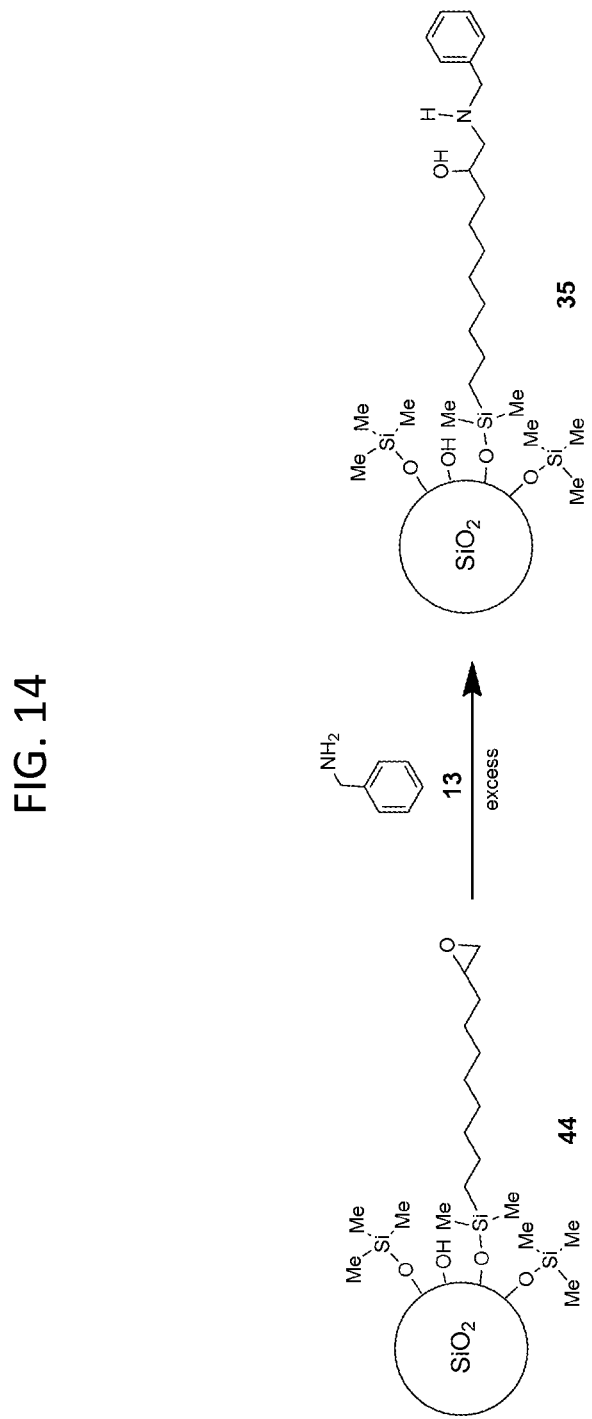
FIG. 14 illustrates the preparation of phase 35.

Preparation of Phase 35 (FIG. 14)

4.0 mL of benzylamine (13) in 10 mL of D.I. water and 10 mL of DMF can be dissolved in a 40-mL glass vial to make a uniform solution. 4.0 g of Phase 44 can be added to the vial and sealed with a screw cap. Mix the resulting mixture till uniformity. Keep the reaction mixture at 50° C. with gentle tumbling for 40 min. The reaction mixture can be filtered followed by washing the cake with methanol (50 mL), 0.1% phosphoric acid aqueous solution (200 mL), D.I. water (50 mL) and acetonitrile (100 mL) to give Phase 35.

Chromatographic Applications

This section describes chromatographic evaluation results. Various bonded phases are packed into 3 (i.d.)×150 (length) mm stainless steel columns using traditional high-pressure slurry techniques.

Example 25

Hydrophobicity Comparison

Figure 15:
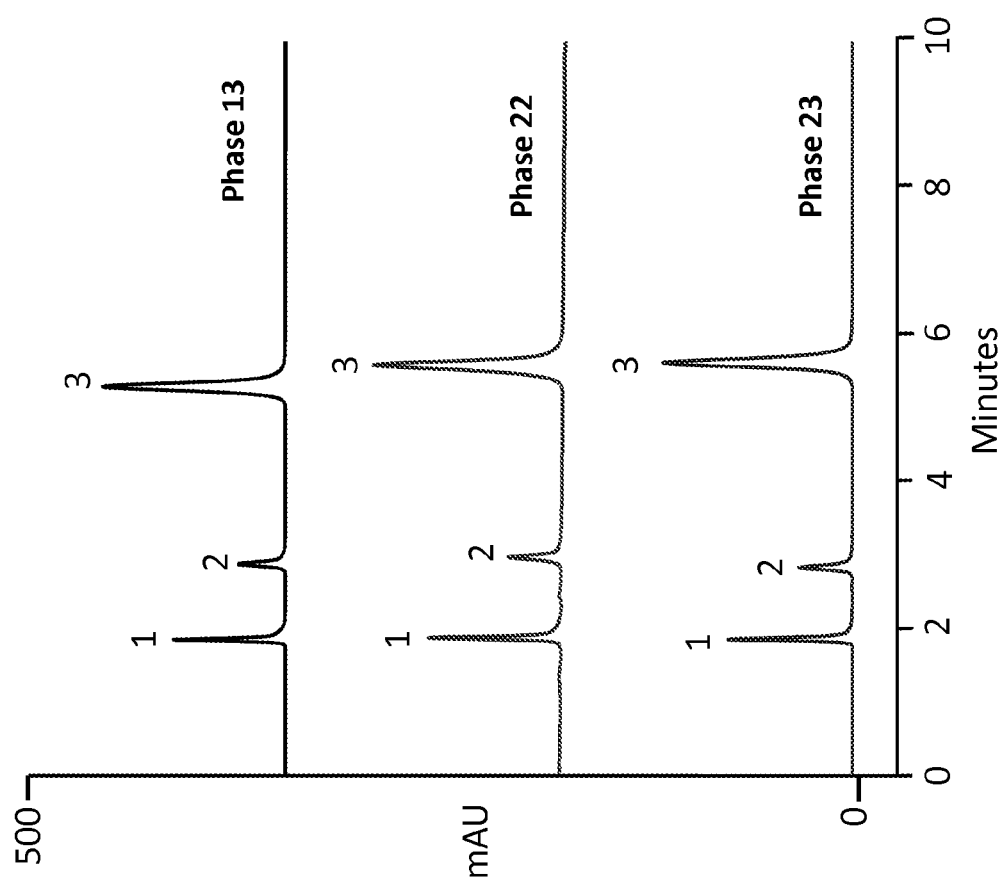
FIG. 15 illustrates the hydrophobicity properties of the compositions.

Hydrophobicity is an important parameter to characterize a reversed-phase material. FIG. 15 shows the hydrophobicity comparison between Phase 13, the fully hydrolyzed alkyl Phase 10 (oxirane bonded phase) (Phase 10 in FIG. 4) and Phases 22 and 23 which are derived from the reaction between a secondary or tertiary amine and Phase 10 through the epoxy ring-opening reaction. The incorporation of a N-small alkyl substituted amino group with a β-hydroxyl functionality results in mixed-mode phases with both reversed-phase and anion-exchange characteristics. In addition, the hydrophobicity of the phase can be adjusted easily by using reagents with various hydrophobic moieties.

Test condition: column, phases 13, 22 and 23, 5-μm, 3×150-mm; mobile phase, acetonitrile/100 mM ammonium acetate, pH5 (50:50 v/v); flow rate, 0.425 mL/min; injection volume, 1 μL; temperature, 30° C.; detection, 254 nm; and test probes (1 mg/mL each), uracil, dimethylphthalate and phenanthrene.

Example 26

Ion-Exchange Property

Figure 16:
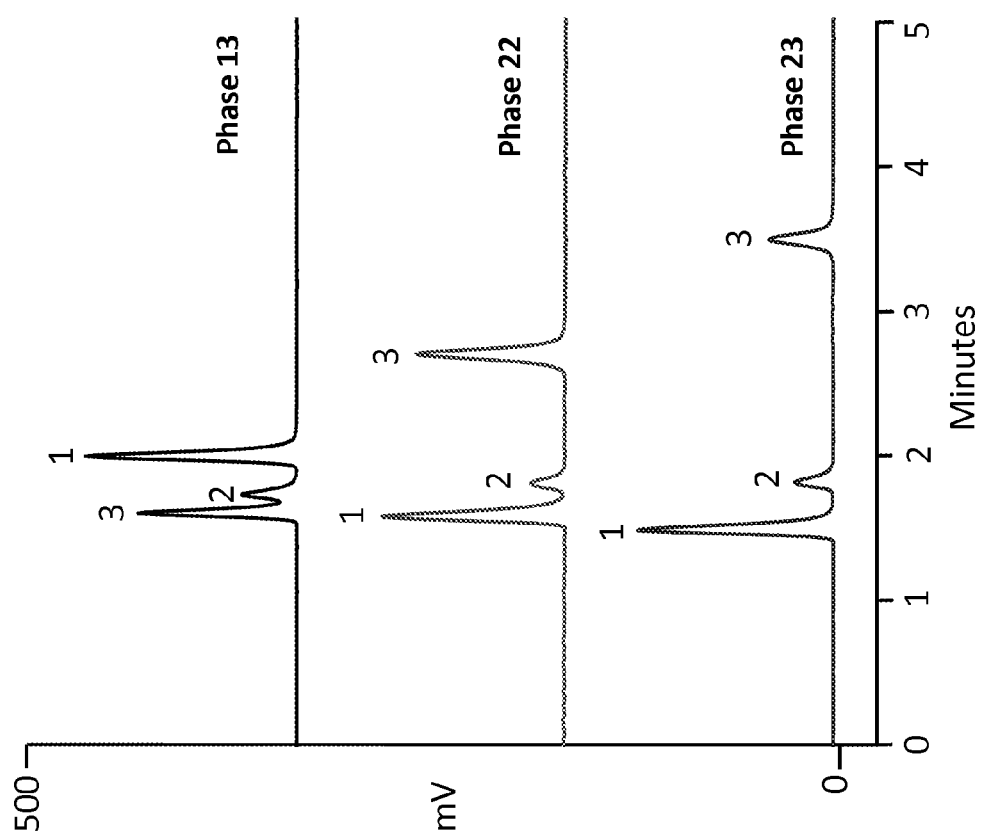
FIG. 16 illustrates ion-exchange properties of the compositions.

The ion-exchange property was characterized using an anion (peak 3 in FIG. 16), a cation (peak 1 in FIG. 16), and a neutral (peak 2 in FIG. 16) analyte in a mobile phase with controlled ionic strength and pH. FIG. 16 shows the ion-exchange property test results of Phase 13, the fully hydrolyzed alkyl Phase 10 (oxirane bonded phase) (Phase 10 in FIG. 4) and Phases 22 and 23 which are derived from the reaction between a secondary or tertiary amine and Phase 10 through the epoxy ring-opening reaction. The testing probes are sodium ion, chloride ion and glucose. Due to the hydrophilic nature of glucose, it was not retained by ion-exchange, reversed-phase or normal phase interaction under the testing conditions. Thus, it serves as a void marker. Elution of the chloride ion after glucose suggests an anion-exchange phase. Elution of the chloride ion before glucose suggests a cation-exchange phase. As shown in FIG. 16, both phases 22 and 23 exhibit anion-exchange property while the benchmark phase 13 shows slight cation-exchange property due to the residual surface silanol groups. It is also worth mentioning that various ion-exchange materials can be synthesized using the epoxide-ring opening reaction to give anion-exchange, cation-exchange, or zwitterionic stationary phases, as shown in FIGS. 4 through 14.

Test condition: column, phases 13, 22 and 23, 5-μm, 3×150-mm; mobile phase, acetonitrile/100 mM ammonium acetate, pH5/D.I. water (50:10:40 v/v/v); flow rate, 0.425 mL/min; injection volume, 1 μL; temperature, 30° C.; detection, aerosol based detector; and test probes (1 mg/mL each): NaCl and glucose.

Example 27

Separation of Ions

Figure 17:
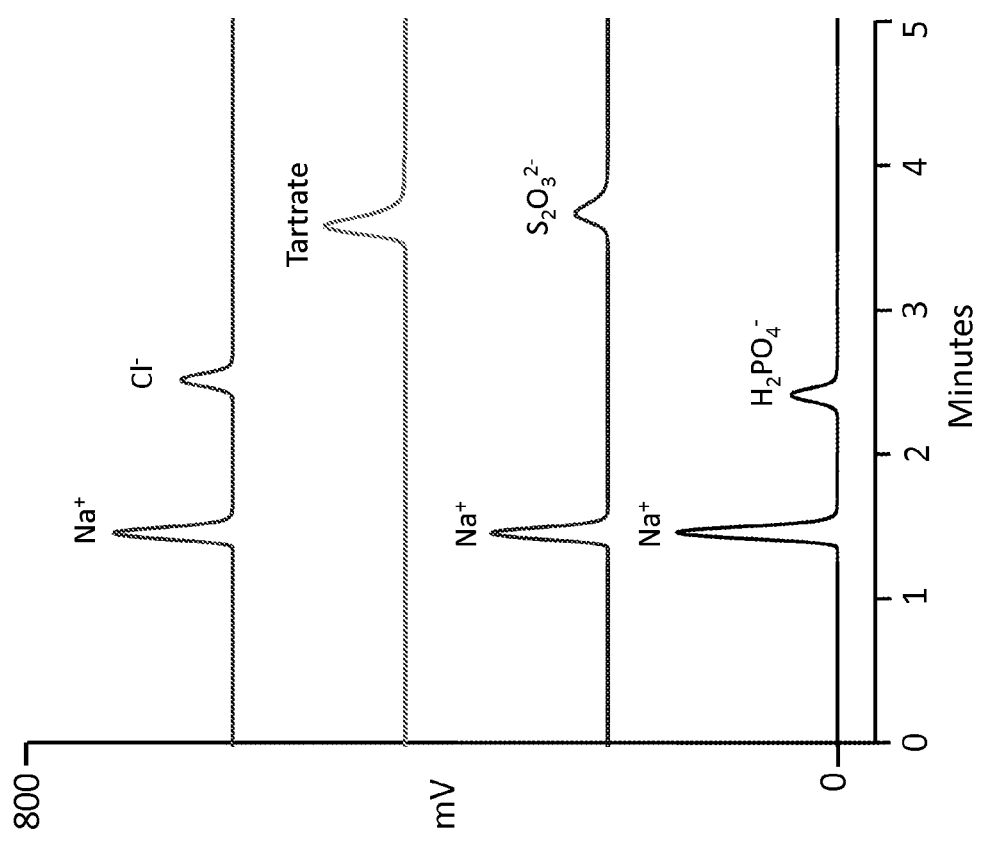
FIG. 17 illustrates the separation of ions on Phase 22.

Salt formation is important in drug development to improve biopharmaceutical and physicochemical properties of the drug. Approximately 50% of all drugs are formulated as salt forms. The assay of counter ions by liquid chromatography requires separation media with ion-exchange property and the reversed-phase column alone generally cannot provide adequate retention for these hydrophilic charged analytes. FIG. 17 illustrates the anion-exchange characteristics of Phase 22, on which several anions, such as chloride, thiosulfate, phosphate and tartrate are retained by electrostatic attractions while the counter ion-sodium ion is not retained due to electrostatic repulsion.

Test condition: column, phase 22, 5-μm, 3×150-mm; mobile phase, 10 mM ammonium acetate, pH 5; flow rate, 0.425 mL/min; injection volume, 1 μL; temperature, 30° C.; detection, aerosol based detector; and test probes (1 mg/mL each): sodium chloride, tartaric acid, sodium thiosulfate and sodium dihydrogen phosphate.

Example 28A

Simultaneous Determination of Drug Molecule and Counter Ion

Figure 18:
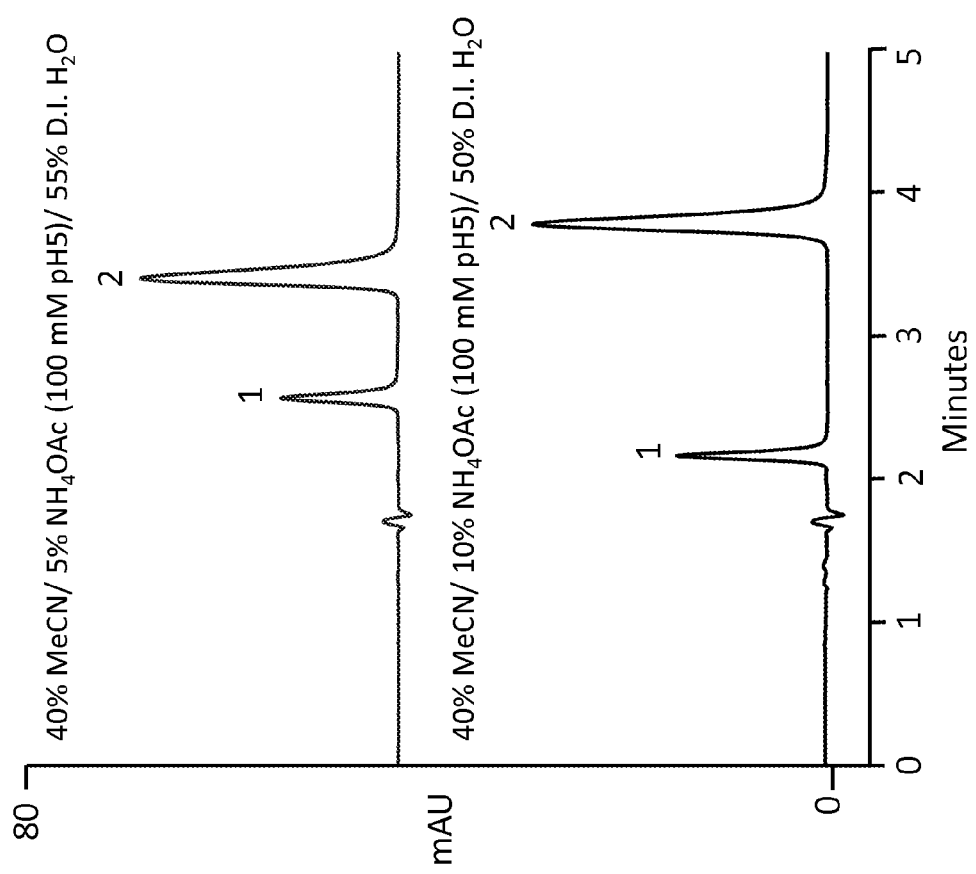
FIG. 18 illustrates the determination of drug molecule and counter ion on Phase 22.
Figure 19:
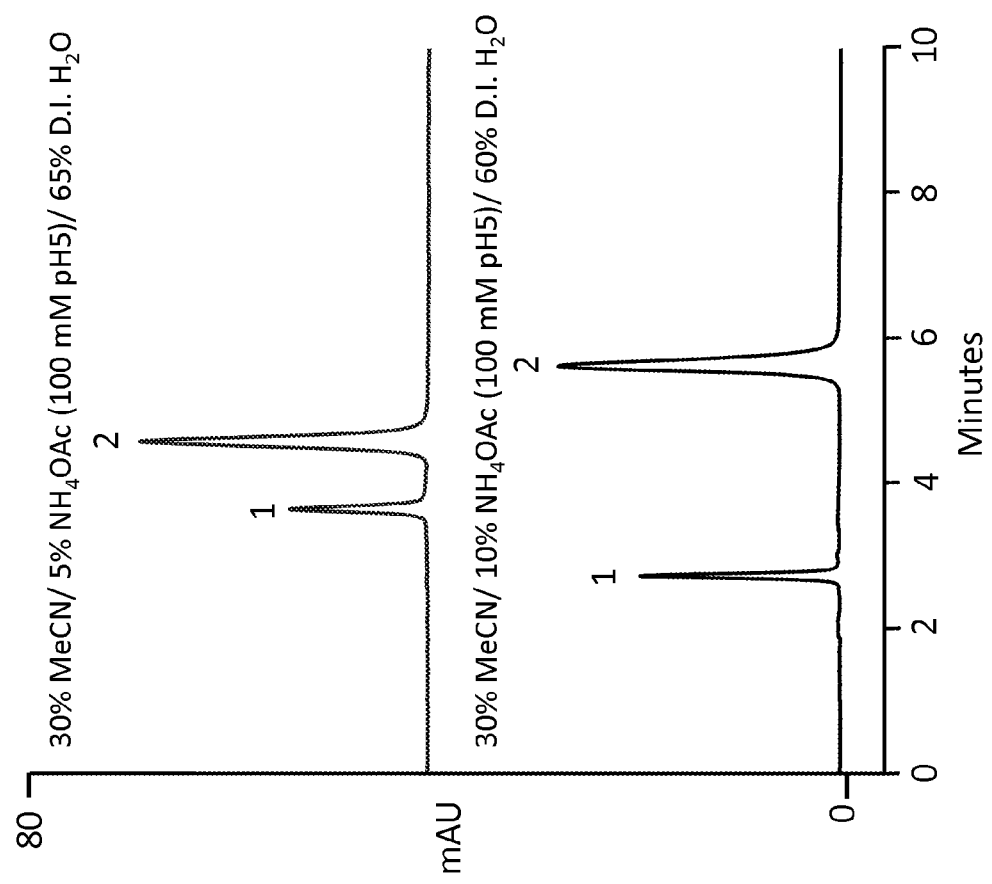
FIG. 19 illustrates the determination of drug molecule and counter ion on Phase 23.

In pharmaceutical analysis, API and the counter ion are often analyzed using different methods, different separation columns, and different instruments. Many medicines contain charged drug molecules with respective counterions. Thus it is desired that both drug molecules and counter ions can be determined within the same analysis, which is very challenging due to the fact that reversed-phase columns often fail to provide adequate retention for counter ions and that most ion-exchange phases are unable to retain drug molecules. FIG. 18 demonstrates the separation of a hydrophobic basic drug molecule, trimipramine and its counter ion, maleate on Phase 22. FIG. 19 demonstrates the separation of a hydrophobic basic drug molecule, trimipramine and its counter ion, maleate on Phase 23. The hydrophilic counter ion, maleate is mainly retained by anion-exchange interactions while the retention for trimipramine depends on the net effect of hydrophobic (reversed-phase) interactions provided by the alkyl chain on the stationary phase and electrostatic repulsion between the analyte and the amino functionality on the stationary phase. FIGS. 18 and 19 also show that the selectivity can be adjusted by changing mobile phase ionic strength. Both drug molecule and counter ion are adequately retained and well resolved.

Test condition: column, phases 22 and 23, 5-μm, 3×150-mm; mobile phase, acetonitrile/100 mM ammonium acetate, pH5/D.I. water (40:5:55 and 40:10:50 v/v/v for Phase 22 and 30:5:65 and 30:10:60 v/v/v for Phase 23); flow rate, 0.425 mL/min; injection volume, 1 μL; temperature, 30° C.; detection, 240 nm; and test probe: Trimipramine maleate.

Example 28B

Evaluation of Phase 24

Figure 20:
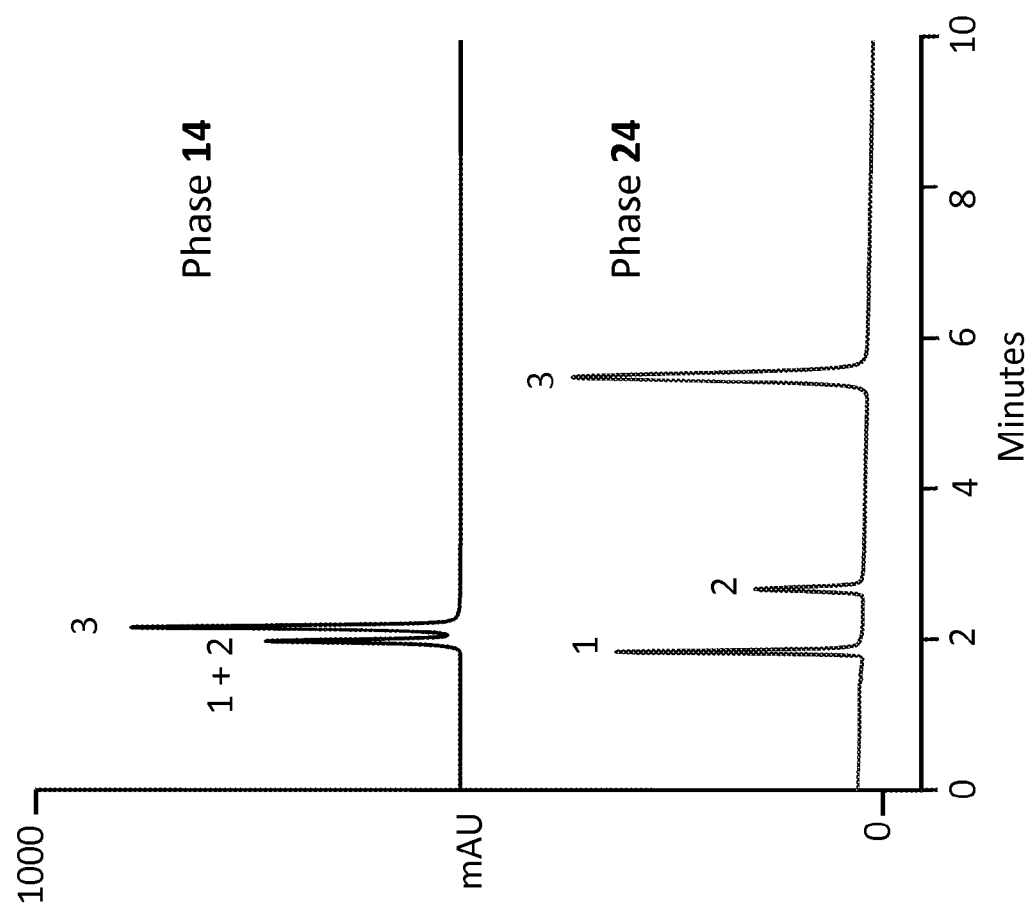
FIG. 20 illustrates the hydrophobicity comparison between Phase 14 and Phase 24.
Figure 21:
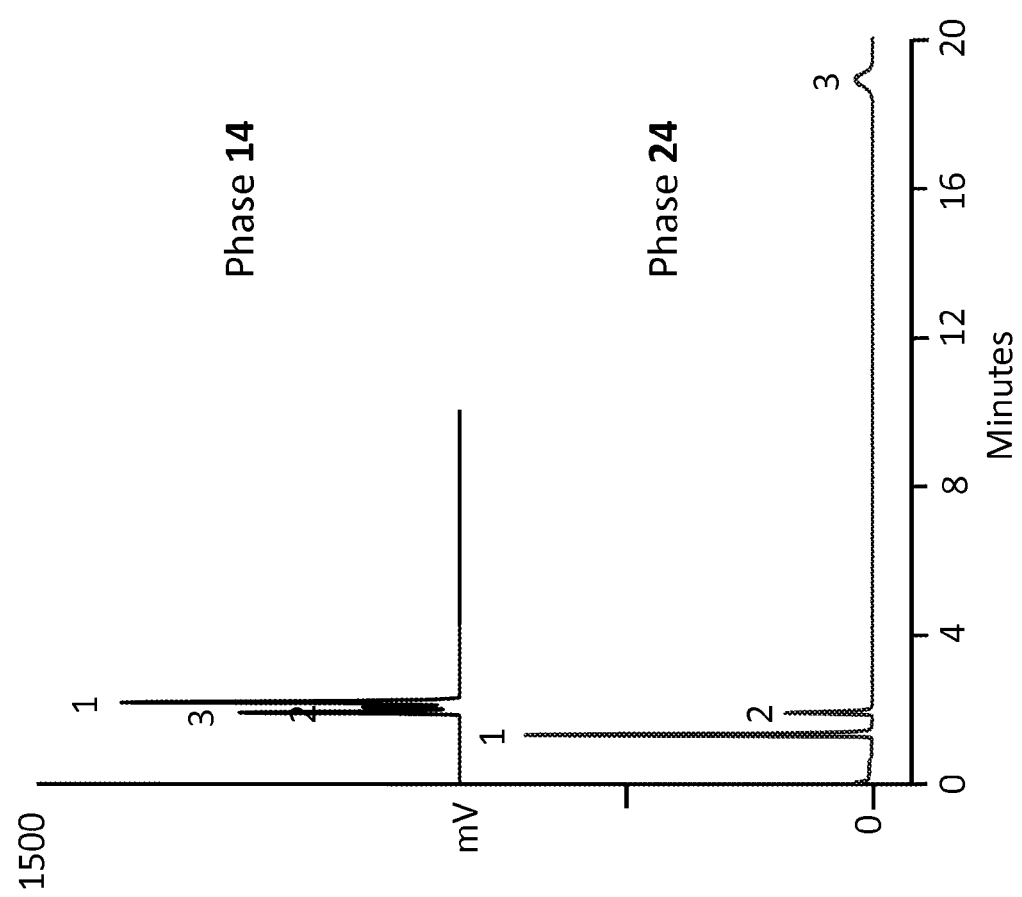
FIG. 21 illustrates the ion-exchange property between Phase 14 and Phase 24.

Hydrophobicity is an important parameter to characterize a reversed-phase material. FIG. 20 and FIG. 21 show the hydrophobicity and ion-exchange comparisons, respectively, between Phase 14, the fully hydrolyzed glycidyl ether Phase 11 (oxirane bonded phase) and Phase 24 which are derived from the reaction between a primary alkyl amine (dodecylamine) and Phase 11 through the epoxy ring-opening reaction. The incorporation of a N-long alkyl substituted amino group with a β-hydroxyl functionality results in a mixed-mode phase with significant increases in both hydrophobic retention and anion-exchange characteristics.

Test condition for hydrophobicity comparison: column, phases 14 and 24, 5-μm, 3×150-mm; mobile phase, acetonitrile/100 mM ammonium acetate, pH5 (50:50 v/v); flow rate, 0.425 mL/min; injection volume, 1 μL; temperature, 30° C.; detection, 254 nm; and test probes (1 mg/mL each), uracil, dimethylphthalate and phenanthrene.

Test condition for ion-exchange comparison: column, phases 14 and 24, 5-μm, 3×150-mm; mobile phase, acetonitrile/100 mM ammonium formate, pH3.8/D.I. water (50:5:45 v/v/v); flow rate, 0.425 mL/min; injection volume, 1 μL; temperature, 30° C.; detection, aerosol based detector; and test probes (1 mg/mL each): NaCl and glucose.

Example 29

Evaluation of Phase 25

Figure 22:
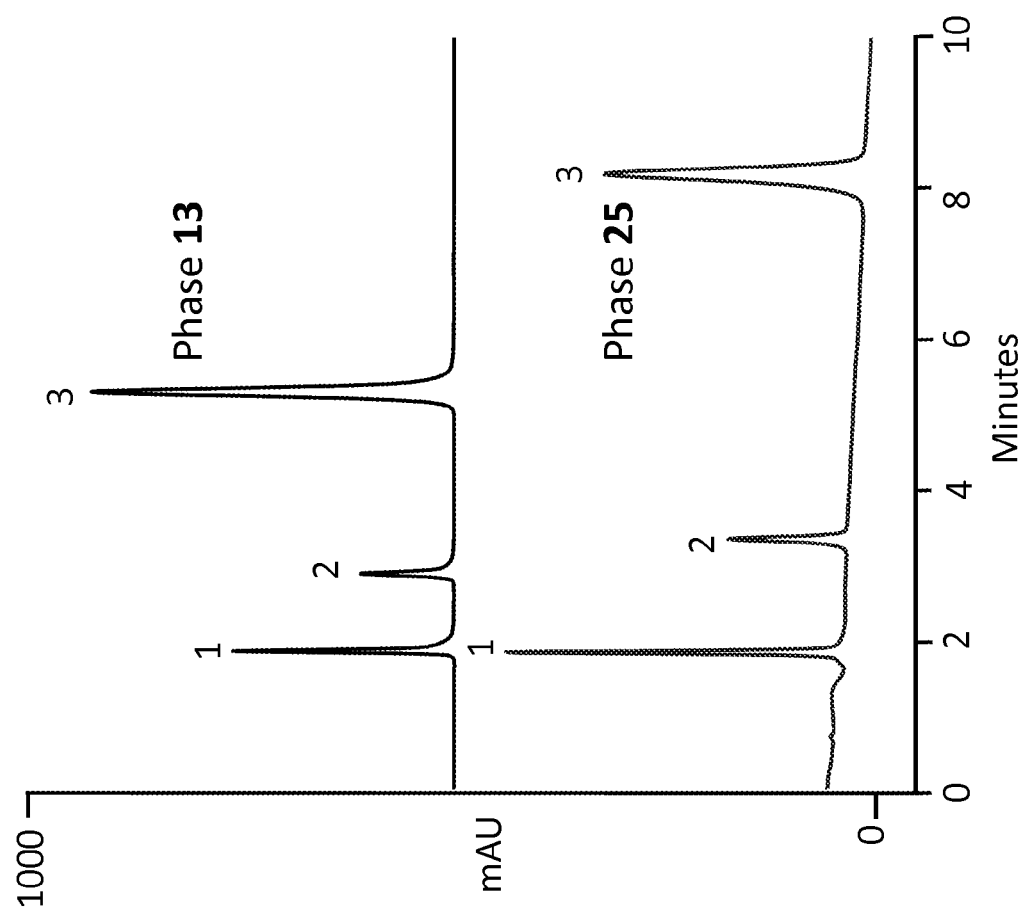
FIG. 22 illustrates the hydrophobicity comparison between Phase 13 and Phase 25.
Figure 23:
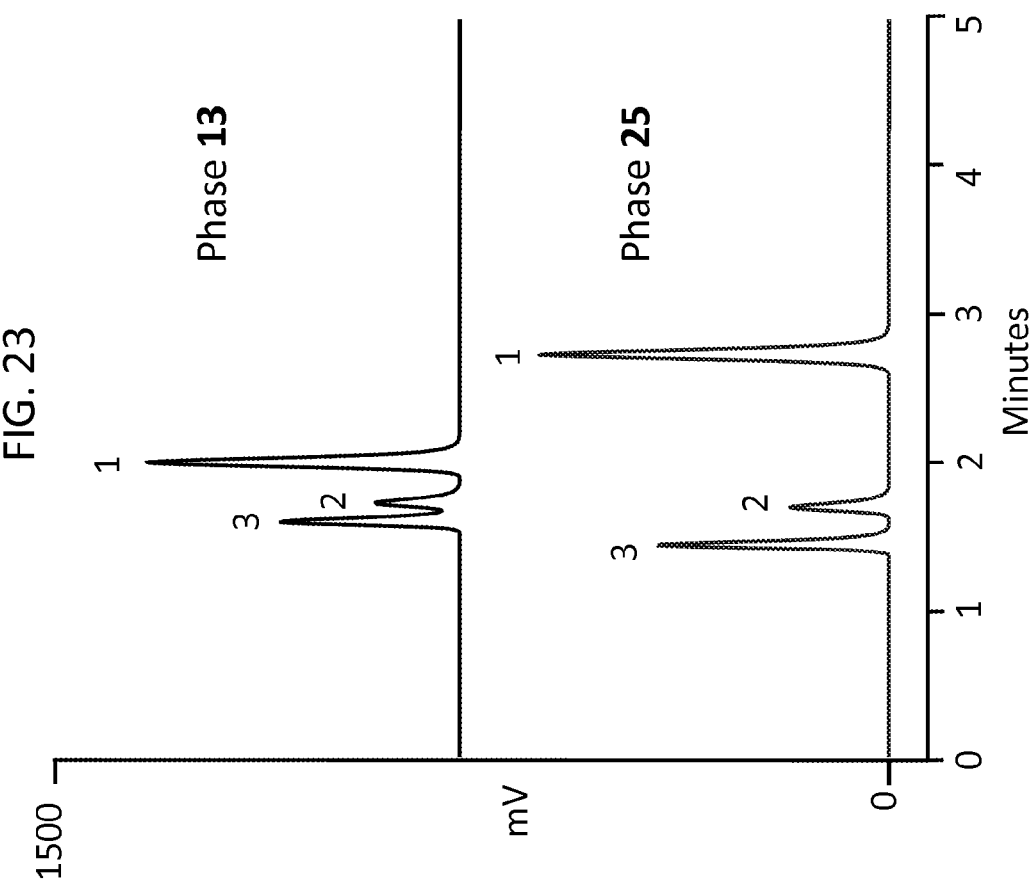
FIG. 23 illustrates the ion-exchange property between Phase 13 and Phase 25.

Hydrophobicity is an important parameter to characterize a reversed-phase material. FIG. 22 and FIG. 23 show the hydrophobicity and ion-exchange comparisons, respectively, between Phase 13, the fully hydrolyzed glycidyl ether Phase 10 (oxirane bonded phase) and Phase 25 which are derived from the reaction between a mercapto carboxylic acid (1-mercaptoproprionic acid) and Phase 10 through the epoxy ring-opening reaction. The incorporation of a small carboxylic group at the terminus of the bonded ligand through a thioether linkage in a mixed-mode phase results in a noticeable increase in hydrophobic retention and cation-exchange characteristics.

Test condition for hydrophobicity comparison: column, phases 13 and 25, 5-μm, 3×150-mm; mobile phase, acetonitrile/100 mM ammonium acetate, pH5 (50:50 v/v); flow rate, 0.425 mL/min; injection volume, 1 μL; temperature, 30° C.; detection, 254 nm; and test probes (1 mg/mL each), uracil, dimethylphthalate and phenanthrene.

Test condition for ion-exchange comparison: column, phases 13 and 25, 5-μm, 3×150-mm; mobile phase, acetonitrile/100 mM ammonium acetate, pH5/D.I. water (50:10:40 v/v/v); flow rate, 0.425 mL/min; injection volume, 1 μL; temperature, 30° C.; detection, aerosol based detector; and test probes (1 mg/mL each): NaCl and glucose.

Example 30

Evaluation of Phase 29

Figure 24:
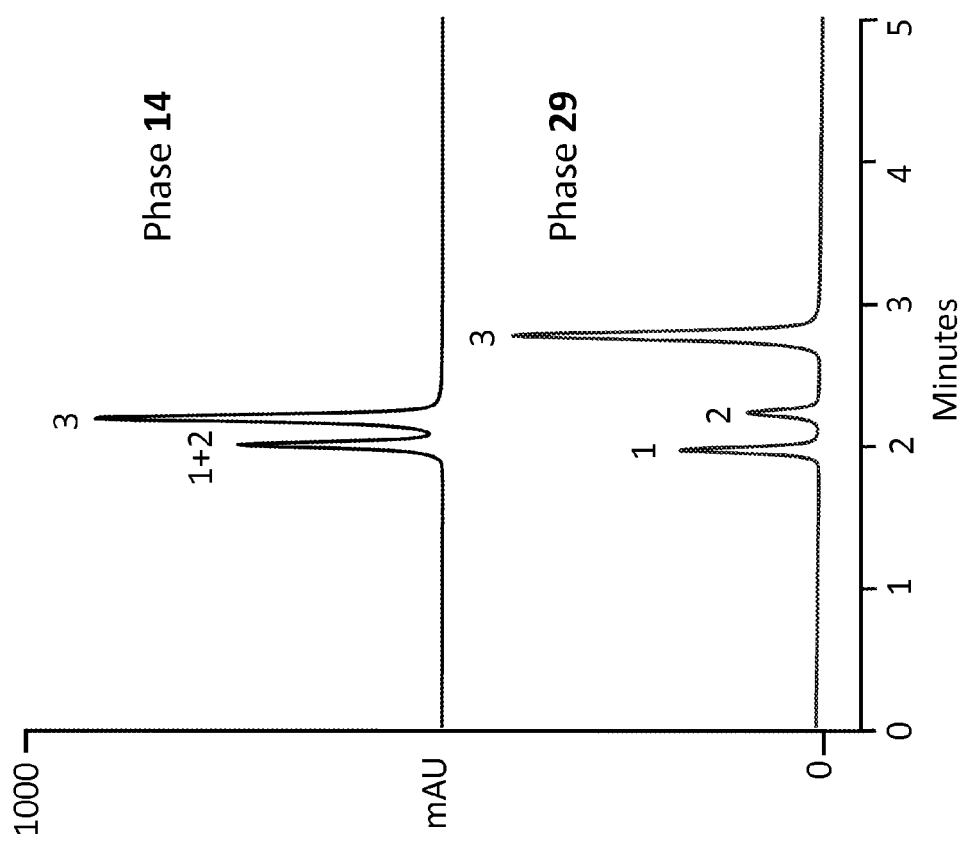
FIG. 24 illustrates the hydrophobicity comparison between Phase 14 and Phase 29.
Figure 25:
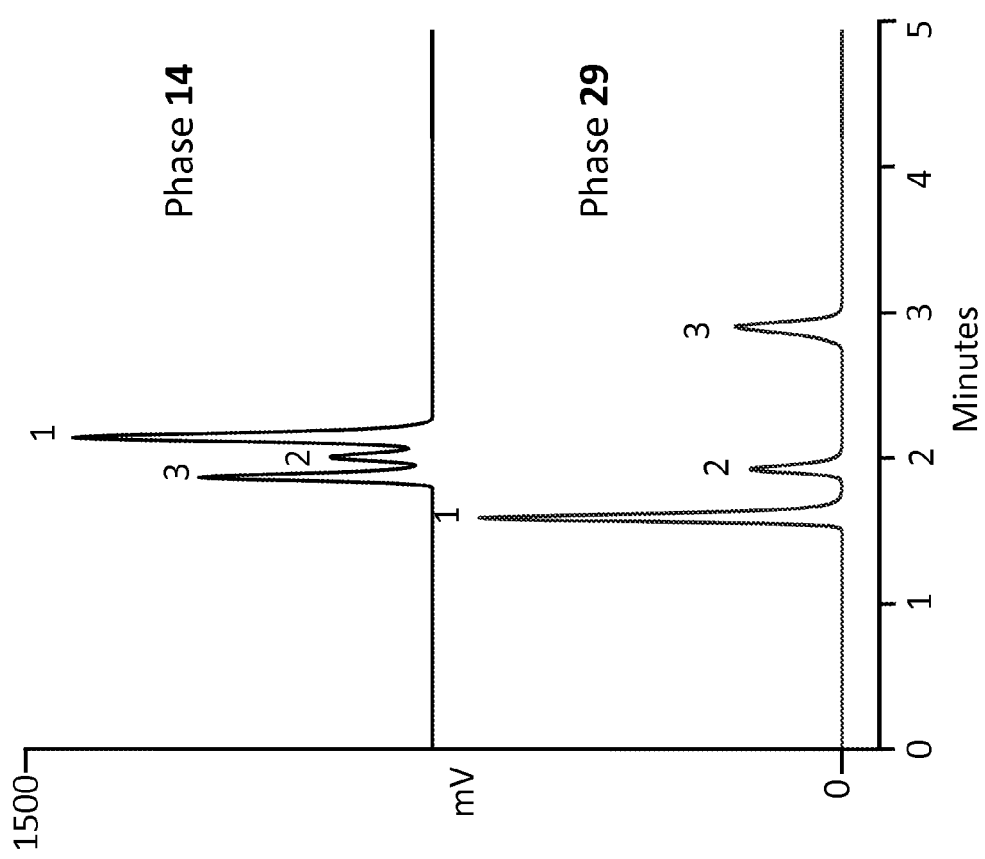
FIG. 25 illustrates the ion-exchange property between Phase 14 and Phase 29.

FIG. 24 and FIG. 25 show the hydrophobicity and ion-exchange comparisons, respectively, between Phase 14, the fully hydrolyzed glycidyl ether Phase 11 (oxirane bonded phase) and Phase 29 which are derived from the reaction between a small secondary amine (diethylamine)) and Phase 11 through the epoxy ring-opening reaction. The incorporation of a small amine with a β-hydroxyl functionality results in a mixed-mode phase with significant increases in both hydrophobic retention and anion-exchange characteristics.

Test condition for hydrophobicity comparison: column, phases 14 and 29, 5-μm, 3×150-mm; mobile phase, acetonitrile/100 mM ammonium acetate, pH5 (50:50 v/v); flow rate, 0.425 mL/min; injection volume, 1 μL; temperature, 30° C.; detection, 254 nm; and test probes (1 mg/mL each), uracil, dimethylphthalate and phenanthrene.

Test condition for ion-exchange comparison: column, phases 14 and 29, 5-μm, 3×150-mm; mobile phase, acetonitrile/100 mM ammonium formate, pH3.8/D.I. water (50:5:45 v/v/v); flow rate, 0.425 mL/min; injection volume, 1 μL; temperature, 30° C.; detection, aerosol based detector; and test probes (1 mg/mL each): NaCl and glucose.

Example 31

Evaluation of Phase 30

Figure 26:
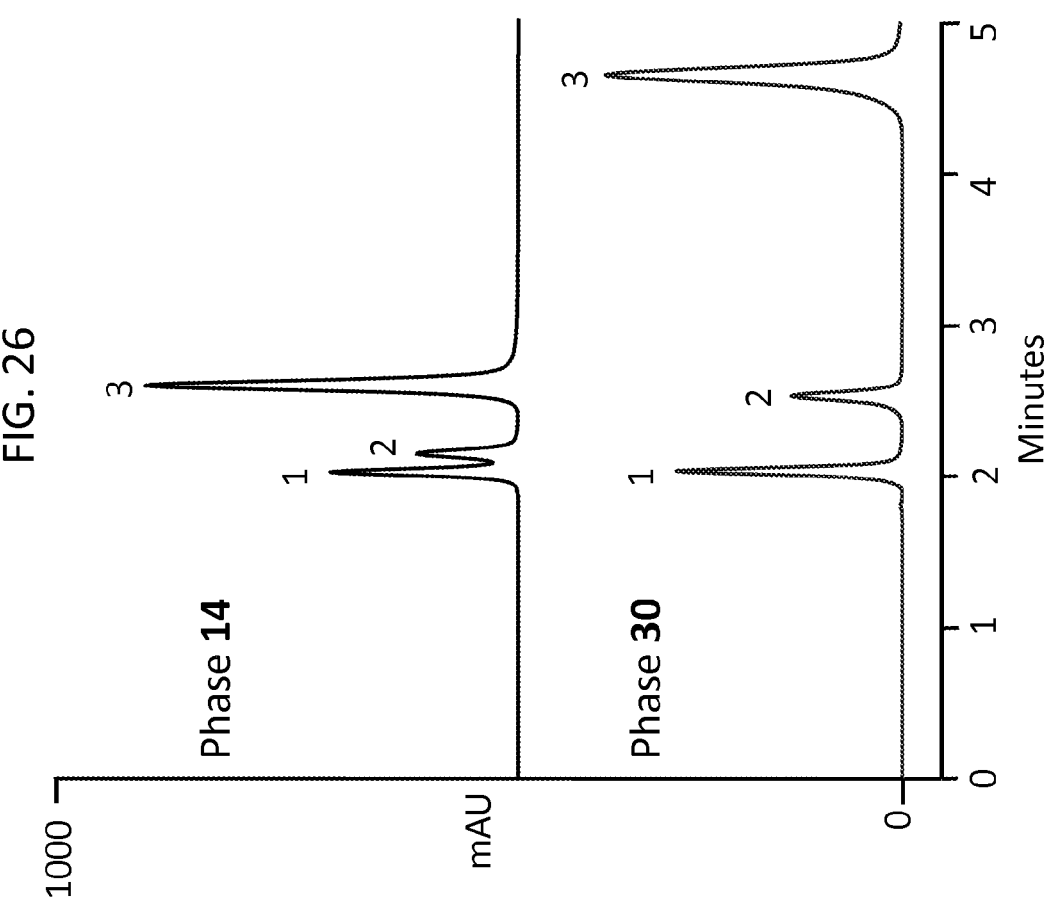
FIG. 26 illustrates the hydrophobicity comparison between Phase 14 and Phase 30.
Figure 27:
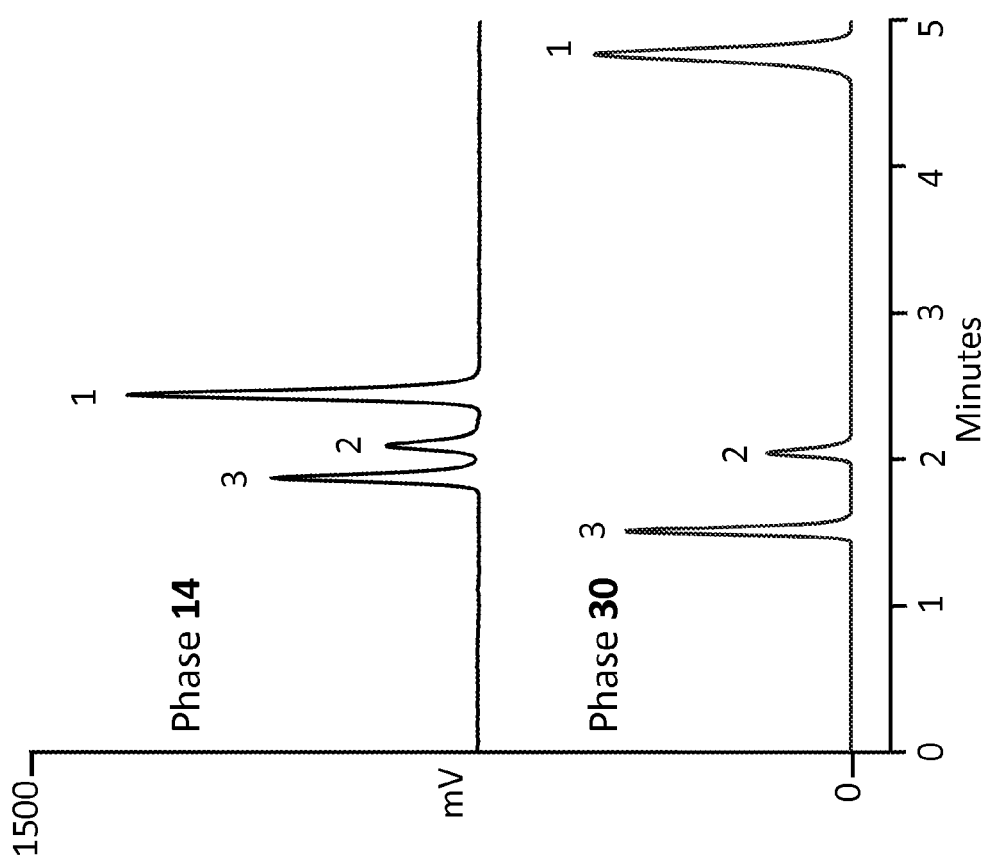
FIG. 27 illustrates the ion-exchange property between Phase 14 and Phase 30.

Hydrophobicity is an important parameter to characterize a reversed-phase material. FIG. 26 and FIG. 27 show the hydrophobicity and ion-exchange comparisons, respectively, between Phase 14, the fully hydrolyzed glycidyl ether Phase 11 (oxirane bonded phase) and Phase 30 which are derived from the reaction between a mercapto carboxylic acid (1-mercaptoproprionic acid) and Phase 11 through the epoxy ring-opening reaction. The incorporation of a small carboxylic group at the terminus of the bonded ligand through a thiol ether linkage in a mixed-mode phase results in a noticeable increase in hydrophobic retention and cation-exchange characteristics.

Test condition for hydrophobicity comparison: column, phases 14 and 30, 5-μm, 3×150-mm; mobile phase, acetonitrile/100 mM ammonium acetate, pH5 (35:65 v/v); flow rate, 0.425 mL/min; injection volume, 1 μL; temperature, 30° C.; detection, 254 nm; and test probes (1 mg/mL each), uracil, dimethylphthalate and phenanthrene.

Test condition for ion-exchange comparison: column, phases 14 and 30, 5-μm, 3×150-mm; mobile phase, acetonitrile/100 mM ammonium acetate, pH5/D.I. water (50:10:40 v/v/v); flow rate, 0.425 mL/min; injection volume, 1 μL; temperature, 30° C.; detection, aerosol based detector; and test probes (1 mg/mL each): NaCl and glucose.

It is understood that the examples and embodiments described herein are for illustrative purposes only and that various modifications or changes in light thereof will be suggested to persons skilled in the art and are to be included within the spirit and purview of this application and scope of the appended claims. It is to be understood that the present invention covers all combinations of aspects and/or embodiments, as well as suitable, convenient and preferred groups described herein. All publications, patents, and patent applications cited herein are hereby incorporated by reference in their entirety for all purposes.

What is claimed is:

1. A composition comprising a compound covalently bound to a substrate, said compound having a structure according to Formula (I):

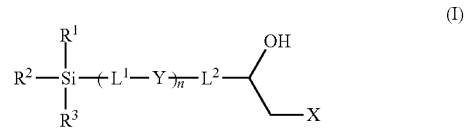

in which n is an integer selected from 0 and 1;

X is selected from the group consisting of $NR^fR^{21}R^{22}$, $SR^f$ or $OR^f$ wherein, when X is $NR^fR^{21}R^{22}$, $R^f$ is selected from the group consisting of unsubstituted alkyl or substituted alkyl with at least one member selected from carboxylic acid, sulfonic acid, phosphoric acid, and an amino moiety and unsubstituted heteroalkyl or substituted heteroalkyl with at least one member selected from carboxylic acid, sulfonic acid, phosphoric acid, and an amino moiety;

$R^{21}$ is selected from the group consisting of H, substituted or unsubstituted alkyl, and substituted or unsubstituted heteroalkyl; and $R^{22}$ is selected from the group consisting of a lone pair of electrons, H, substituted or unsubstituted alkyl, and substituted or unsubstituted heteroalkyl;

wherein when X is $SR^f$ or $OR^f$, $R^f$ is substituted alkyl or substituted heteroalkyl each with at least one member selected from carboxylic acid, sulfonic acid, phosphoric acid and an amino acid;

$R^1$, $R^2$ and $R^3$ are selected independently from the group consisting of halogen, $OR^{10}$, $NR^{10}R^{11}$, $OC(O)R^{12}$, $OS(O)_2R^{12}$, substituted or unsubstituted alkyl, substituted or unsubstituted heteroalkyl, substituted or unsubstituted aryl, substituted or unsubstituted heteroaryl, substituted or unsubstituted heterocycloalkyl and a bond to said substrate wherein each $R^{10}$ and each $R^{11}$ is selected independently from the group consisting of H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to a silica gel substrate, with the proviso that at least one of $R^1$, $R^2$ and $R^3$ is unsubstituted $C_1$-$C_3$ alkyl or OH, and further with the proviso that at least one of $R^1$, $R^2$ and $R^3$ is covalently bound to said substrate;

each $R^{12}$ is selected independently from the group consisting of substituted or unsubstituted alkyl, substituted or unsubstituted heteroalkyl, substituted or unsubstituted aryl, substituted or unsubstituted heteroaryl, and substituted or unsubstituted heterocycloalkyl;

$L^1$ and $L^2$ are linker groups independently selected from substituted or unsubstituted alkyl, substituted or unsubstituted heteroalkyl, substituted or unsubstituted aryl, substituted or unsubstituted heteroaryl and substituted or unsubstituted heterocycloalkyl; and Y is O.

2. The composition of claim 1, wherein $R^1$, $R^2$ and $R^3$ are selected independently from the group consisting of $OR^{10}$, $OC(O)R^{12}$, $OS(O)_2R^{12}$, and unsubstituted alkyl, wherein each $R^{10}$ and each $R^{11}$ is selected independently from the group consisting of H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to a silica gel substrate;

each $R^{12}$ is selected independently from the group consisting of substituted or unsubstituted alkyl, substituted or unsubstituted heteroalkyl, substituted or unsubstituted aryl, substituted or unsubstituted heteroaryl, and substituted or unsubstituted heterocycloalkyl;

$L^1$ is $C_3$ unsubstituted alkyl; and $L^2$ is $C_1$-$C_8$ unsubstituted alkyl.

3. The composition of claim 1, wherein the structure is according to Formula (II):

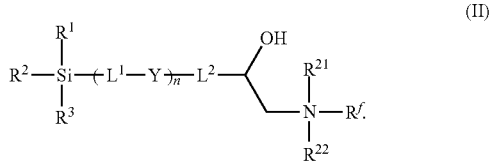

(II)

4. The composition of claim 2, wherein $R^{21}$ is unsubstituted alkyl and $R^{22}$ is unsubstituted alkyl.

5. The composition of claim 2, wherein $R^{21}$ is unsubstituted $C_1$ or $C_2$ or $C_3$ alkyl and $R^{22}$ is unsubstituted $C_1$ or $C_2$ or $C_3$ alkyl.

6. The composition of claim 2, wherein $R^{22}$ is a lone pair of electrons.

7. The composition of claim 2, wherein $R^{21}$ is H and $R^{22}$ is a lone pair of electrons.

8. The composition of claim 1, wherein $R^f$ is alkyl substituted with a member selected from carboxylic acid, sulfonic acid, phosphoric acid, an amino acid and a combination thereof.

9. The composition of claim 1, wherein the structure is according to Formula (III):

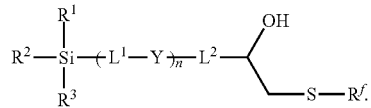

(III)

10. The composition of claim 9, wherein $R^f$ is alkyl substituted with a carboxylic acid.

11. The composition of claim 1, with the proviso that at least two of $R^1$, $R^2$ and $R^3$ is covalently bound to said substrate.

12. The composition of claim 1, with the proviso that $R^1$ and R are covalently bound to said substrate and further, $R^3$ is unsubstituted $C_1$-$C_3$ alkyl or OH.

13. The composition of claim 1, with the proviso that $R^1$ and $R^2$ are covalently bound to said substrate, and $R^3$ is methyl.

14. The composition of claim 1, with the proviso that $R^1$ and $R^2$ are covalently bound to said substrate, and $R^3$ is OH.

15. The composition of claim 1, wherein n is 0, and $L^2$ is $C_1$-$C_8$ unsubstituted alkyl.

16. The composition of a claim 1, wherein n is 0, and $L^2$ is $C_5$-$C_8$ unsubstituted alkyl.

17. The composition of claim 1, wherein n is 0, and $L^2$ is $C_8$ unsubstituted alkyl.

18. The composition of claim 1, wherein n is 1, and $L^1$ is $C_2$-$C_5$ unsubstituted alkyl, and $L^2$ is $C_1$-$C_3$ unsubstituted alkyl.

19. The composition of claim 1, wherein n is 1, and $L^1$ is $C_3$ unsubstituted alkyl, and $L^2$ is $C_1$ unsubstituted alkyl.

20. A chromatographic system comprising the composition of claim 1 in a chromatographic column in fluidic communication with one or more of:
a) a suppressor;
b) an injection valve;
c) a source of eluent; and
d) a detector.

21. The composition of claim 3, wherein, $R^f$ is an unsubstituted alkyl.

22. The composition of claim 3, wherein, $R^f$ is an unsubstituted heteroalkyl.

* * * * *